US012597981B2

(12) United States Patent
Raghavan et al.

(10) Patent No.: US 12,597,981 B2
(45) Date of Patent: Apr. 7, 2026

(54) ENABLING UPLINK COHERENCE WITH DISCRETE ANTENNA ELEMENTS VIA SIGNALING

(71) Applicant: QUALCOMM Incorporated, San Diego, CA (US)

(72) Inventors: Vasanthan Raghavan, West Windsor Township, NJ (US); Kobi Ravid, Closter, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 18/645,989

(22) Filed: Apr. 25, 2024

(65) Prior Publication Data

US 2025/0337476 A1      Oct. 30, 2025

(51) Int. Cl.
*H04B 7/08*      (2006.01)

(52) U.S. Cl.
CPC .................................. *H04B 7/0802* (2013.01)

(58) Field of Classification Search
CPC .. H04B 7/0802; H04B 7/0404; H04B 7/0608; H04B 7/0691; H04B 7/0874; H04B 17/12
See application file for complete search history.

(56) References Cited

U.S. PATENT DOCUMENTS

| | | | | |
|---|---|---|---|---|
| 2016/0087337 A1* | 3/2016 | Khlat | ..................... | H01Q 3/267 |
| | | | | 320/108 |
| 2022/0303918 A1 | 9/2022 | Sun et al. | | |

800 ⟶

| | | | | |
|---|---|---|---|---|
| 2022/0393744 A1* | 12/2022 | Karjalainen | ......... | H04B 7/0697 |
| 2023/0308312 A1* | 9/2023 | Asplund | ................ | H04B 17/12 |
| 2024/0187072 A1* | 6/2024 | Yang | .................... | H04B 7/0628 |
| 2024/0297688 A1* | 9/2024 | Huang | ................. | H04B 7/0486 |

FOREIGN PATENT DOCUMENTS

| | | |
|---|---|---|
| EP | 4432718 A1 | 9/2024 |
| WO | 2019213889 | 11/2019 |
| WO | 2023084702 A1 | 5/2023 |

OTHER PUBLICATIONS

International Search Report and Written Opinion—PCT/US2025/017508—ISA/EPO—May 28, 2025.

* cited by examiner

*Primary Examiner* — David B Lugo
(74) *Attorney, Agent, or Firm* — Harrity & Harrity, LLP

(57)                ABSTRACT

Various aspects of the present disclosure generally relate to wireless communication. In some aspects, a user equipment (UE) may transmit an assistance indication that requests antenna coherence assistance to configure two or more discrete antenna elements with a coherence that satisfies a coherence threshold. The UE may perform, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements. Numerous other aspects are described.

20 Claims, 11 Drawing Sheets

810 ⟶ Transmit an assistance indication that requests antenna coherence assistance to configure two or more discrete antenna elements with a coherence that satisfies a coherence threshold 820 ⟶ Perform, based at least in part on signaling, an antenna coherence establishment procedure that is based at least in part on using a first discrete antenna element of the two or more discrete antenna elements as an anchor antenna element, and obtaining a respective phase relationship between the anchor antenna element and at least a second discrete antenna element of the two or more discrete antenna elements

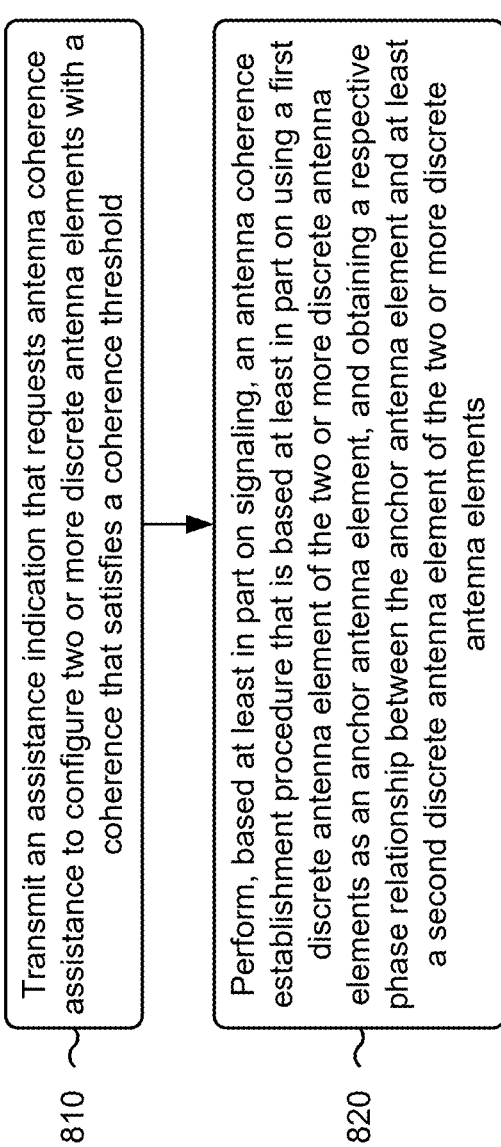

810 Transmit an assistance indication that requests antenna coherence assistance to configure two or more discrete antenna elements with a coherence that satisfies a coherence threshold 820 Perform, based at least in part on signaling, an antenna coherence establishment procedure that is based at least in part on using a first discrete antenna element of the two or more discrete antenna elements as an anchor antenna element, and obtaining a respective phase relationship between the anchor antenna element and at least a second discrete antenna element of the two or more discrete antenna elements

Receive an assistance indication that requests antenna coherence assistance to configure two or more discrete antenna elements at a user equipment (UE) with a coherence that satisfies a coherence threshold

910

Perform, based at least in part on wireless signaling, an antenna coherence establishment procedure with the UE based at least in part on signaling

920

900

Reception Component 1102

Communication Manager 1106

Transmission Component 1104

1108

1100

ENABLING UPLINK COHERENCE WITH DISCRETE ANTENNA ELEMENTS VIA SIGNALING

FIELD OF THE DISCLOSURE

Aspects of the present disclosure generally relate to wireless communication and specifically relate to techniques, apparatuses, and methods for enabling uplink coherence with discrete antenna elements via signaling.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a user equipment (UE). The method may include transmitting an assistance indication that requests antenna coherence assistance to configure two or more discrete antenna elements with a coherence that satisfies a coherence threshold. The method may include performing, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

Some aspects described herein relate to a method of wireless communication performed by a network node. The method may include receiving an assistance indication that requests antenna coherence assistance to configure two or more discrete antenna elements at a UE with a coherence that satisfies a coherence threshold. The method may include performing, based at least in part on wireless signaling, an antenna coherence establishment procedure with the UE based at least in part on signaling.

Some aspects described herein relate to an apparatus for wireless communication at a UE. The apparatus may include one or more memories and one or more processors coupled to the one or more memories. The one or more processors may be configured to transmit an assistance indication that requests antenna coherence assistance to configure two or more discrete antenna elements with a coherence that satisfies a coherence threshold. The one or more processors may be configured to perform, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

Some aspects described herein relate to an apparatus for wireless communication at a network node. The apparatus may include one or more memories and one or more processors coupled to the one or more memories. The one or more processors may be configured to receive an assistance indication that requests antenna coherence assistance to configure two or more discrete antenna elements at a UE with a coherence that satisfies a coherence threshold. The one or more processors may be configured to perform, based at least in part on wireless signaling, an antenna coherence establishment procedure with the UE based at least in part on signaling.

Some aspects described herein relate to a non-transitory computer-readable medium that stores a set of instructions for wireless communication by a UE. The set of instructions, when executed by one or more processors of the UE, may cause the UE to transmit an assistance indication that requests antenna coherence assistance to configure two or more discrete antenna elements with a coherence that satisfies a coherence threshold. The set of instructions, when executed by one or more processors of the UE, may cause the UE to perform, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

Some aspects described herein relate to a non-transitory computer-readable medium that stores a set of instructions for wireless communication by a network node. The set of instructions, when executed by one or more processors of the network node, may cause the network node to receive an assistance indication that requests antenna coherence assistance to configure two or more discrete antenna elements at a UE with a coherence that satisfies a coherence threshold. The set of instructions, when executed by one or more processors of the network node, may cause the network node to perform, based at least in part on wireless signaling, an antenna coherence establishment procedure with the UE based at least in part on signaling.

Some aspects described herein relate to an apparatus for wireless communication. The apparatus may include means for transmitting an assistance indication that requests antenna coherence assistance to configure two or more discrete antenna elements with a coherence that satisfies a coherence threshold. The apparatus may include means for performing, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

Some aspects described herein relate to an apparatus for wireless communication. The apparatus may include means for receiving an assistance indication that requests antenna coherence assistance to configure two or more discrete antenna elements at a UE with a coherence that satisfies a coherence threshold. The apparatus may include means for performing, based at least in part on wireless signaling, an antenna coherence establishment procedure with the UE based at least in part on signaling.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a diagram illustrating an example process performed, for example, at a UE or an apparatus of a UE, in accordance with the present disclosure.

DETAILED DESCRIPTION

Figure 1:
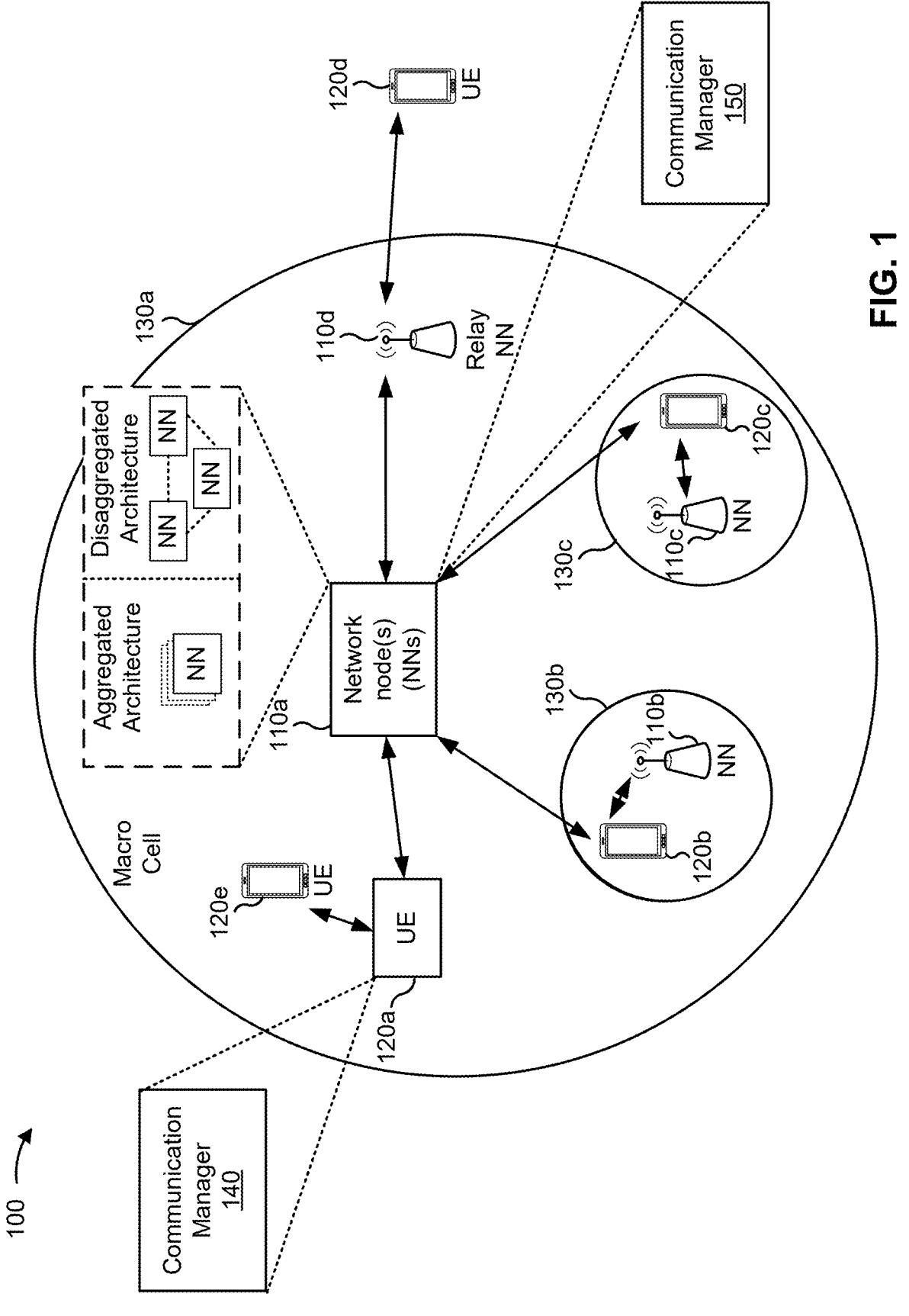
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A user equipment (UE) may include multiple discrete antenna elements for a variety of reasons, such as for antenna selection diversity in which a receiver device (e.g., a UE) may select a particular antenna from multiple antennas to use for receiving a signal. That is, the receiver device may receive and/or process a signal using the particular antenna, and/or ignore signal(s) received via the other antennas. A discrete antenna element, such as a monopole antenna element and/or a uni-polarized antenna element, may be better suited for antenna selection diversity relative to other antenna elements and/or antenna modules. For instance, a uni-polarized antenna element may enable a maximum signal strength and/or mitigate interference in point-to-point communication environments where a polarization mismatch may result in signal degradation (e.g., reduced signal strength and/or increased interference). Alternatively, or additionally, the UE may use a discrete antenna element for particular frequency ranges, such as designated frequency range FR1 (410 Megahertz (MHz) through 7.125 gigahertz (GHz)) and/or designated frequency range FR3 ((7.125 GHz through 24.25 GHz), for reduced cost, reduced complexity, reduced size, flexible placement for operation, and/or non-line-of-sight performance.

An antenna array may utilize multiple antenna elements that reside in a same antenna module, and the antenna module may be driven by a radio frequency integrated circuit (RFIC) chip. Alternatively, or additionally, an antenna module may be configured and/or controlled through the use of a single and/or multiple RFICs that enable the co-phasing of signals (e.g., phase synchronization and/or phase alignment) across the antenna elements and, consequently, beamforming. Accordingly, uplink coherence may be present between the antenna elements in an antenna module. To illustrate, respective signals transmitted and/or received via each antenna element may be configured based at least in part in inter-RFIC calibration information. However, each discrete antenna element at a UE may use different hardware from one another and/or may be driven by different RFICs. Accordingly, at least for the reason that each discrete antenna element may be implemented in different hardware and/or driven by different RFICs, inter-RFIC calibration information, as well as intra-RFIC calibration, may not exist across the discrete antenna elements.

Reliable uplink coherence between antenna elements relates to the ability to control and/or configure a phase offset and/or an array gain of an output signal in a deterministic manner. Based at least in part on discrete antenna elements being designed to be uncorrelated, uplink coherence between the discrete antenna elements may be difficult to achieve, based at least in part on several factors. In one example, each discrete antenna element may be associated with a respective RF chain, and the digital-to-analog-converters (DACs) used in each RF chain may not be synchronized with one another, resulting in indeterministic variations between one another. Alternatively, or additionally, fractional synthesizers (e.g., reference dividers) across local oscillators (LOs) may not be reliably synchronized, resulting in the LOs producing signals that are not consistently in phase with one another. In yet another example, a change in a transmission state (e.g., from transmitting to not transmitting) may lead to thermal transients and, consequently, unknown phase variations between signals. Another factor may include antenna placement on a housing and/or a chassis. For instance, FR1 wavelengths may differ from FR2 wavelengths and/or FR3 wavelengths, resulting in discrete antenna elements being placed at locations on the housing and/or chassis that do not lead to overlap in coverage. While some phase errors between signals and/or RF chains of discrete antenna elements may be semi-static and/or semi-persistent, other phase errors may be more dynamic, resulting in inconsistent and/or unreliable coherence (e.g., uplink coherence) between discrete antenna elements. An inconsistent and/or unreliable coherence between discrete antenna elements may result in an inability to use the discrete antenna elements in a combined manner and, consequently, reduced gain (e.g., reduced signal power) in a transmission. The reduced gain may result in increased data recovery errors, increased data transfer latencies, and/or reduced data throughput in a wireless network.

Various aspects relate generally to enabling uplink coherence with discrete antenna elements via signaling. Some aspects more specifically relate to a UE and a network node performing an antenna coherence establishment procedure that enables uplink coherence with discrete antenna elements. In some aspects, a UE may transmit an assistance indication that requests antenna coherence assistance to configure two or more discrete antenna elements with a coherence that satisfies a coherence threshold. To illustrate, the coherence threshold may be based at least in part on performing coordinated transmissions by the discrete antenna elements to within a measure of accuracy (e.g., direction accuracy, beamwidth accuracy, and/or array gain accuracy). Based at least in part on transmitting the assistance indication, the UE may perform an antenna coherence establishment procedure that uses signaling (e.g., downlink signaling, uplink signaling, and/or sidelink signaling) and is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

In some aspects, a network node may receive an assistance indication that requests antenna coherence assistance to configure two or more discrete antenna elements at a UE with a coherence that satisfies a coherence threshold. Based at least in part on receiving the assistance indication, the network node may perform an antenna coherence establishment procedure with the UE based at least in part on signaling. For example, the network node may transmit a downlink signal and/or may receive an uplink signal as part of the antenna coherence establishment procedure.

Particular aspects of the subject matter described in this disclosure can be implemented to realize one or more of the following potential advantages. In some examples, by performing an antenna coherence establishment procedure (e.g., with a network node and/or another UE), the described techniques can be used to enable the coordinated use of discrete antenna elements, such as in a combined manner that increases an array gain as described below. The use of signaling in the antenna coherence establishment procedure, such as a downlink signal, an uplink signal, and/or a sidelink signal, may enable a UE to dynamically compute phase differences between the discrete antenna elements based at least in part on a current operating state of the UE, such as a current state of one or more RF chains, LOs, thermal transients, and/or antenna placement relative to current communication wavelength(s). Dynamically computing phase differences may enable the UE to compensate for differences between the discrete antenna elements, such as by applying a respective phase offset to a respective signal processed by a respective discrete antenna element (e.g., transmitted and/or received), resulting in increased consistency and/or increased reliability in a coherence between the discrete antenna elements, resulting in an increased array gain and/or an increased signal quality (e.g., power level). The increased array gain and/or increased signal quality may result in reduced data recovery errors, reduced data transfer latencies, and/or increased data throughput in a wireless network.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*c*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally, or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink May each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally, or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally, or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or MTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120c) may communicate directly with one another using sidelink communications (for example, without communicating by way of a network node 110 as an intermediary). As an example, the UE 120a may directly transmit data, control information, or other signaling as a sidelink communication to the UE 120c. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, collaborate, or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., a UE 120) may include a communication manager 140. As described in more detail elsewhere herein, the communication manager 140 may transmit an assistance indication that requests antenna coherence assistance to configure two or more discrete antenna elements with a coherence that satisfies a coherence threshold; and perform, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements. Additionally, or alternatively, the communication manager 140 may perform one or more other operations described herein.

In some aspects, a network node (e.g., a network node 110) may include a communication manager 150. As described in more detail elsewhere herein, the communication manager 150 may receive an assistance indication that requests antenna coherence assistance to configure two or more discrete antenna elements at a UE with a coherence that satisfies a coherence threshold; and perform, based at least in part on wireless signaling, an antenna coherence establishment procedure with the UE based at least in part on signaling. Additionally, or alternatively, the communication manager 150 may perform one or more other operations described herein.

As indicated above, FIG. 1 is provided as an example. Other examples may differ from what is described with regard to FIG. 1.

Figure 2:
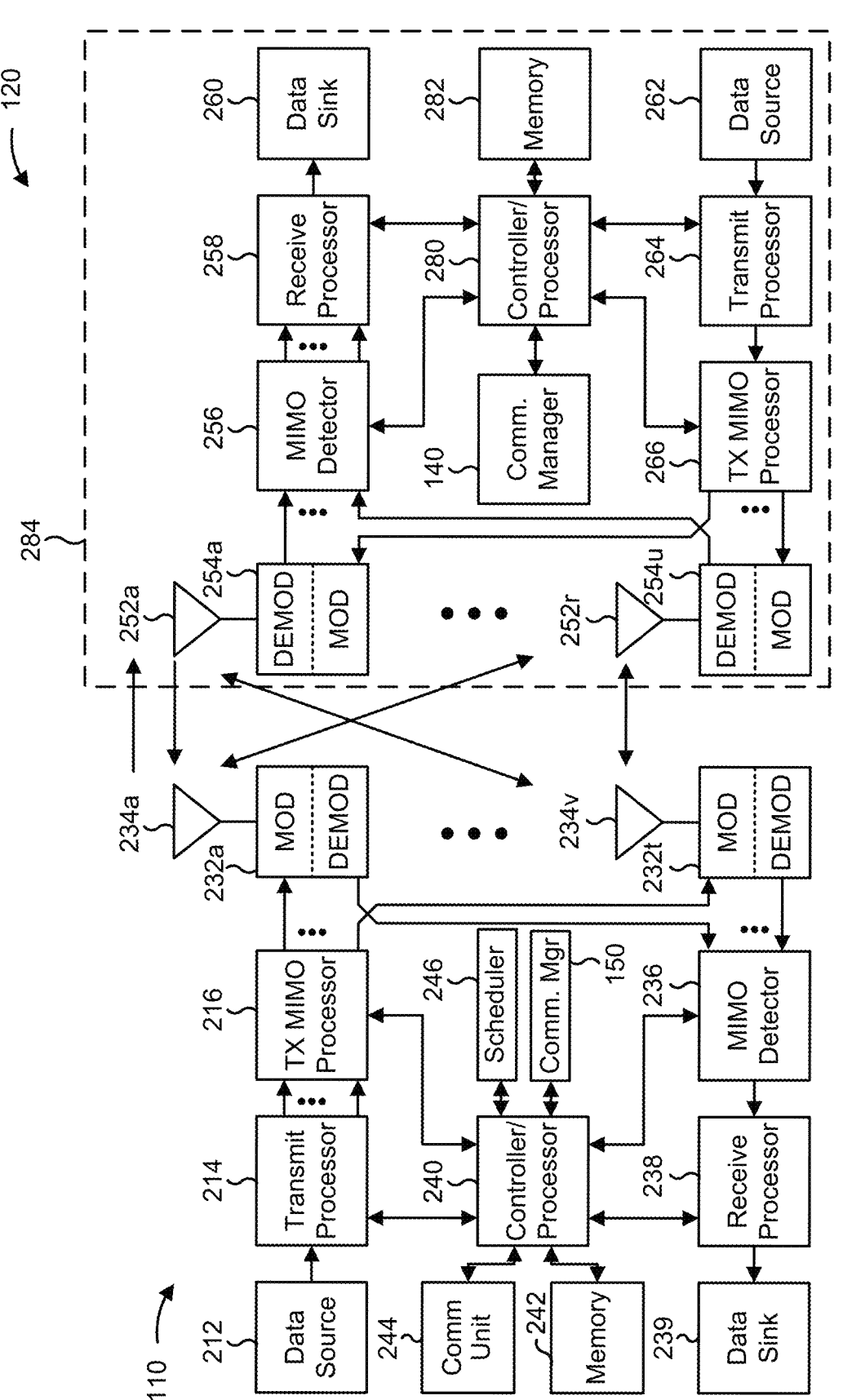
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
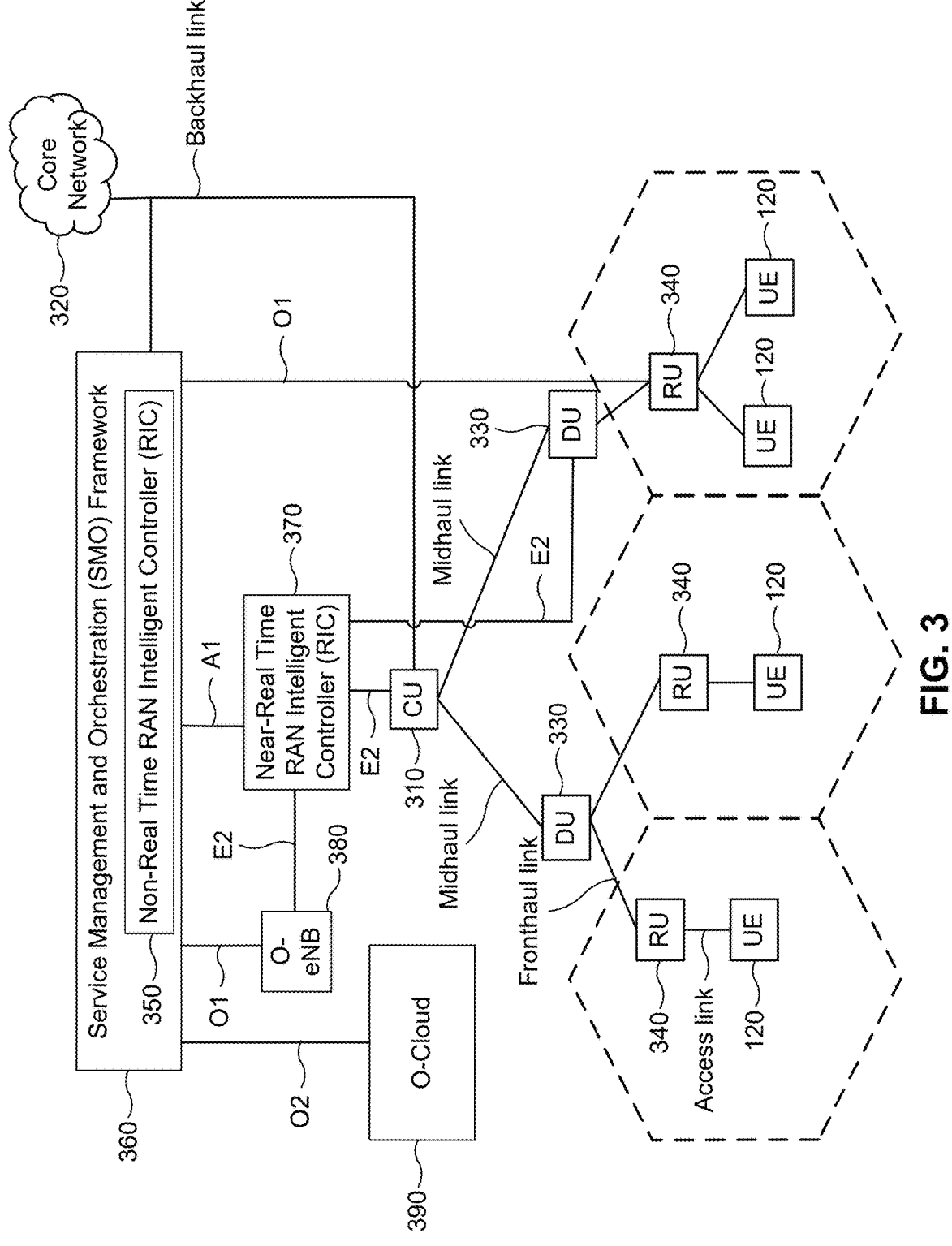
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally, or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with enabling uplink coherence with discrete antenna elements via signaling, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, process 900 of FIG. 9, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, a UE (e.g., a UE 120) includes means for transmitting an assistance indication that requests antenna coherence assistance to configure two or more discrete antenna elements with a coherence that satisfies a coherence threshold; and/or means for performing, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements. The means for the UE 120 to perform operations described herein may include, for example, one or more of communication manager 140, uniantenna 252, modem 254, MIMO detector 256, receive processor 258, transmit processor 264, TX MIMO processor 266, controller/processor 280, or memory 282.

In some aspects, a network node (e.g., a network node 110) includes means for receiving an assistance indication that requests antenna coherence assistance to configure two or more discrete antenna elements at a UE with a coherence that satisfies a coherence threshold; and/or means for performing, based at least in part on wireless signaling, an antenna coherence establishment procedure with the UE based at least in part on signaling. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
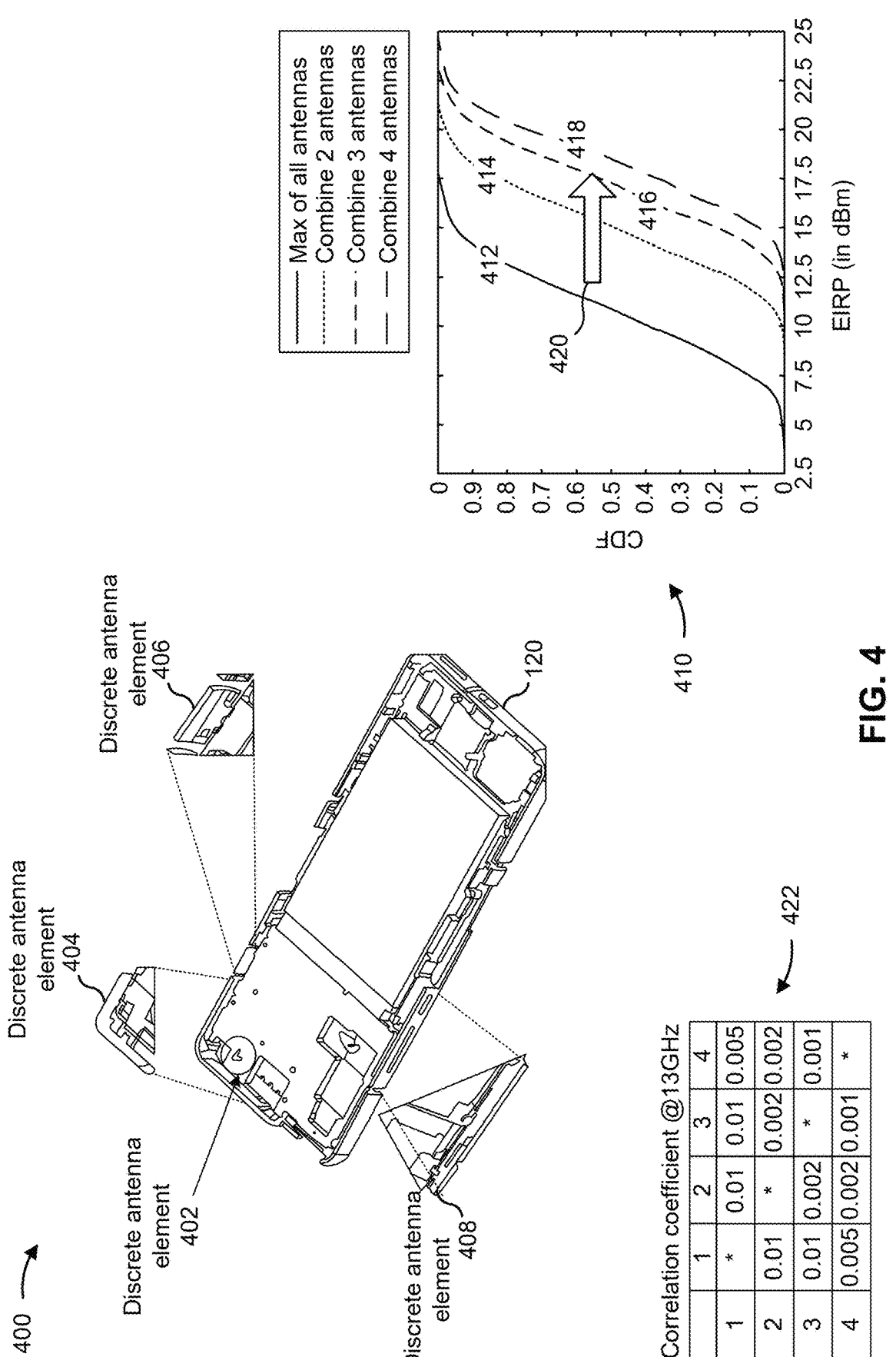
FIG. 4 is a diagram illustrating an example of discrete antenna elements, in accordance with the present disclosure.

FIG. 4 is a diagram illustrating an example 400 of discrete antenna elements, in accordance with the present disclosure.

As described above, an antenna module may include circuitry including one or more antennas, which may also include one or more other components (such as filters, amplifiers, or processors) associated with integrating the antenna module into a wireless communication device. In some aspects, an antenna module may include an antenna panel (e.g., a group of antenna elements) to facilitate wireless communications that are based at least in part on beamforming. To illustrate, an antenna module may be designed and/or configured for wireless communications that utilize FR2 frequencies, such as a design that enables the multiple antenna elements to be used for analog beamforming, to increase an array gain, and/or to increase a signal power level. In some aspects, the antenna elements of an antenna module may be driven by and/or coupled to a same RF integrated circuit (IC), resulting in an ability to co-phase the respective signals (e.g., phase synchronization and/or phase alignment) processed by the antenna elements to enable beamforming.

"Antenna selection diversity" may denote a receiver device (e.g., a UE 120) selecting a particular antenna from multiple antennas to use for receiving a signal. To illustrate, a UE may include multiple discrete antenna elements that are designed to operate independently of one another. As part of using antenna selection diversity, the UE may calculate a respective received signal power level of a respective signal processed by a respective discrete antenna device, and may select to use a particular discrete antenna element for transmission and/or reception based at least in part on the particular discrete antenna element being associated with the highest received signal power level. Accordingly, the UE may receive and/or process a signal using the particular discrete antenna element and/or ignore signal(s) received via the other discrete antenna elements. Antenna selection diversity may enable the UE to increase an observed signal quality (e.g., an observed power level) by selecting the discrete antenna element with the best reception quality to mitigate signal degradation as observed by the UE, such as signal degradation due to fading. In some aspects, a discrete antenna element, such as a monopole antenna element and/or a uni-polarized antenna element, may be better suited for antenna selection diversity relative to other antenna elements and/or antenna modules. For instance, a uni-polarized antenna element may enable a maximum signal strength and/or mitigate interference in point-to-point communication environments where a polarization mismatch may result in signal degradation (e.g., reduced signal strength and/or increased interference).

Antenna elements in an antenna module may have more coherence (e.g., uplink coherence and/or transmission coherence) relative to discrete antenna modules. To illustrate, a UE may transmit and/or receive FR2 communications using the antenna elements within an antenna module by configuring the respective signals transmitted and/or received via each antenna element using inter-RFIC calibration information. For FR1 and/or FR3 communications, the UE may use a discrete antenna element (e.g., using antenna selection diversity). In a scenario in which the UE includes multiple discrete antenna elements, inter-RFIC calibration information may not exist across discrete antenna elements, at least for the reason that each discrete antenna element may be implemented in different hardware and/or may be driven by different RFICs.

FIG. 4 illustrates a cutaway view of a UE 120 that partially expands and exposes antenna placement at the UE 120. In the example 400, the UE 120 includes four discrete antenna elements: discrete antenna element 402, discrete antenna element 404, discrete antenna element 406, and discrete antenna element 408, and the four discrete antenna elements included in the UE 120 may be designed to be uncorrelated with one another to mitigate fading and/or interference. Alternatively, or additionally, and as shown by FIG. 4, the four discrete antenna elements may be positioned at different points in the UE 120 to provide signal diversity (e.g., signal propagation and/or signal reception).

In some aspects, the four discrete antenna elements may be designed to be isolated and/or uncorrelated with one another, and the discrete antenna elements being uncorrelated may lead to a hypothesis that generating and/or receiving a transmission using two or more of the discrete antenna elements in a combined manner (e.g., combining the signals transmitted and/or received by each discrete antenna element for RF beamforming, IF beamforming, and/or digital beamforming) may be difficult to achieve, may not produce a beneficial amount of array gain, and/or may not produce a beneficial increase in effective isotropic radiated power (EIRP). However, as shown by graph 410, combining discrete antenna elements (e.g., discrete antenna element 402, discrete antenna element 404, discrete antenna element 406, and discrete antenna element 408) may result in increased signal gain (e.g., an array gain) and/or increased EIRP relative to a signal gain and/or EIRP that is based at least in part on isolated and/or individual operation by each respective discrete antenna element. To illustrate, the graph 410 includes four cumulative distribution function (CDF) plots regarding EIRP. A first plot 412 illustrates a first CDF plot of a maximum EIRP for individual operation of the four discrete antenna elements (e.g., discrete antenna element 402, discrete antenna element 404, discrete antenna element 406, and discrete antenna element 408) operating individually. A second plot 414 illustrates a second CDF plot of an EIRP that is based at least in part on two discrete antenna elements operating in a combined manner (e.g., an array), and a third plot 416 illustrates a third CDF plot of an EIRP that is based at least in part on three discrete antenna elements operating in a combined manner. Similarly, a fourth plot 418 illustrates a fourth CDF plot of an EIRP that is based at least in part on the four discrete antenna elements operating in a combined manner. As shown by reference number 420, EIRP generally increases with the addition of a discrete antenna element to a group of discrete antenna elements that operate in a combined manner. Accordingly, the graph 410 indicates that discrete antenna elements may have an envelope correlation coefficient (e.g., over an entire sphere, when combined as shown by the EIRP CDF plots in graph 410) that leads to an array gain and/or signal gain, generally shown by reference number 422. The envelope correlation coefficient of the discrete antenna elements may be based at least in part on a respective angular spread of each discrete antenna element and/or a respective location of each discrete antenna element in the UE 120. For instance, a chassis and/or housing configuration of the UE 120 may result in at least some overlap in coverage between at least some of the discrete antenna elements, which may increase an array gain when combining the discrete antenna elements.

Reliable uplink coherence between antenna elements relates to the ability to control and/or configure a phase offset and/or an array gain of an output signal in a deterministic manner. Several factors may contribute to the challenges of obtaining uplink coherence between discrete antenna elements. As one example, each discrete antenna element may be associated with a respective RF chain, and the DACs used in each RF chain may not be synchronized with one another, resulting in undeterminable variations between one another. Alternatively, or additionally, fractional synthesizers (e.g., reference dividers) across LOs may not be reliably synchronized, resulting in the LOs producing signals that are not consistently in phase with one another. As yet another example, a change in a transmission state (e.g., from transmitting to not transmitting) may lead to thermal transients and, consequently, unknown phase variations between signals. Another factor may include antenna placement on a housing and/or a chassis. For instance, FR1 wavelengths may differ from FR2 wavelengths and/or FR3 wavelengths, resulting in discrete antenna elements being placed at locations on the housing and/or chassis that do not lead to an overlap in coverage. While some phase errors between signals and/or RF chains of discrete antenna elements may be semi-static and/or semi-persistent, other phase errors may be more dynamic, resulting in inconsistent and/or unreliable coherence (e.g., uplink coherence) between discrete antenna elements. An inconsistent and/or unreliable coherence between discrete antenna elements may result in an inability to use the discrete antenna elements in a combined manner and, consequently, reduced gain (e.g., reduced signal power) in a transmission. The reduced gain may result in increased data recovery errors, increased data transfer latencies, and/or reduced data throughput in a wireless network.

Some techniques and apparatuses described herein provide enablement of uplink coherence with discrete antenna elements via signaling. In some aspects, a UE may transmit an assistance indication that requests antenna coherence assistance to configure two or more discrete antenna elements with a coherence that satisfies a coherence threshold. To illustrate, the coherence threshold may be based at least in part on performing coordinated transmissions by the discrete antenna elements to within a measure of accuracy (e.g., direction accuracy, beamwidth accuracy, and/or array gain accuracy). Based at least in part on transmitting the assistance indication, the UE may perform an antenna coherence establishment procedure that uses signaling (e.g., downlink signaling, uplink signaling, and/or sidelink signaling) and is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

In some aspects, a network node may receive an assistance indication that requests antenna coherence assistance to configure two or more discrete antenna elements at a UE with a coherence that satisfies a coherence threshold. Based at least in part on receiving the assistance indication, the network node may perform an antenna coherence establishment procedure with the UE based at least in part on signaling. For example, the network node may transmit a downlink signal and/or may receive an uplink signal as part of the antenna coherence establishment procedure.

A UE performing an antenna coherence establishment procedure (e.g., with a network node and/or another UE) may enable the coordinated use of discrete antenna elements, such as in a combined manner that increases signal power gain (e.g., by way of an array gain) as described above. The use of signaling in the antenna coherence establishment procedure, such as a downlink signal, an uplink signal, and/or a sidelink signal, may enable the UE to dynamically compute phase differences between the discrete antenna elements based at least in part on a current operating state of the UE, such as a current state of one or more RF chains, LOs, thermal transients, and/or antenna placement relative to current communication wavelength(s). Dynamically computing phase differences may enable the UE to compensate for differences between the discrete antenna elements, such as by applying a respective phase offset to a respective signal processed by a respective discrete antenna element (e.g., transmitted and/or received), resulting in increased consistency and/or increased reliability in a coherence between the discrete antenna elements, an increased array gain, and/or an increased signal quality (e.g., power level). The increased reliability and/or increased signal quality may result in reduced data recovery errors, reduced data transfer latencies, and/or increased data throughput in a wireless network.

As indicated above, FIG. 4 is provided as an example. Other examples may differ from what is described with regard to FIG. 4.

Figure 5:
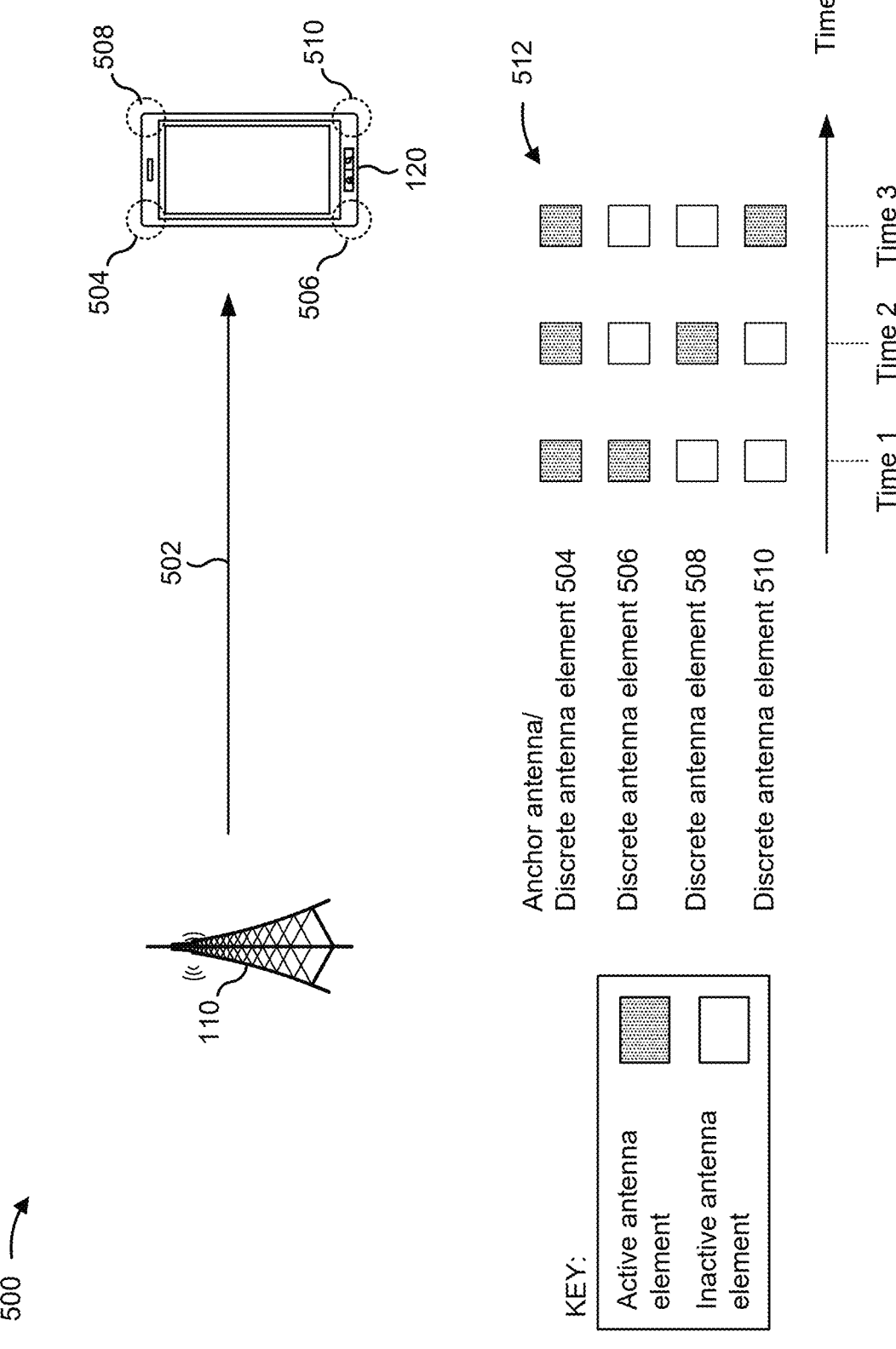
FIG. 5 is a diagram illustrating an example of an antenna coherence establishment procedure, in accordance with the present disclosure.

FIG. 5 is a diagram illustrating an example 500 of an antenna coherence establishment procedure, in accordance with the present disclosure. The example 500 includes a network node 110 and a UE 120 that perform an antenna coherence establishment procedure that is based at least in part on signaling (shown in FIG. 5 as downlink signal 502). Other examples of an antenna coherence establishment procedure may include the UE 120 and the network node 110 alternatively or additionally performing an antenna coherence establishment procedure using uplink signaling and/or a first UE 120 and a second UE 120 performing an antenna coherence establishment procedure using sidelink signaling.

As shown in FIG. 5, the UE 120 may include N discrete antenna elements, N being an integer, that are located at different positions in the UE 120: discrete antenna element 504, discrete antenna element 506, discrete antenna element 508, and discrete antenna element 510. In some aspects, and based at least in part on including N discrete antenna elements, the UE 120 may transmit an assistance indication to the network node 110, and the assistance indication may specify a request for antenna coherence assistance. That is, the UE 120 may request assistance from the network node 110 to obtain information that enables the UE 120 to configure at least two of the N discrete antenna elements (e.g., via configuring one or more signals processed by the discrete antenna elements) with a coherence that satisfies a coherence threshold and/or a reliability threshold. For instance, the coherence threshold may be based at least in part on the UE 120 performing coordinated transmissions using the discrete antenna elements, and the coordinated transmissions may be within a measure of accuracy (e.g., direction accuracy, beamwidth accuracy, and/or array gain accuracy) such that satisfying the coherence threshold enables reliable and/or consistent coherence between the discrete antenna elements. The reliable and/or consistent coherence between the discrete antenna elements may be configured by the UE 120 based at least in part on modifying one or more signal parameters as described above, such as by modifying a phase offset to a first signal that is processed by a first discrete antenna element that mitigates a phase misalignment in the first signal with a second signal that is processed by a second discrete antenna element.

In the example 500, the UE 120 includes N=4 discrete antenna elements, and the discrete antenna elements may be any combination of transmit-only discrete antenna elements, receive-only antenna elements, and/or transmit-receive antenna elements. As at least part of the antenna coherence establishment procedure, the UE 120 may select a particular discrete antenna element to use as an anchor antenna element, shown in FIG. 5 as the discrete antenna element 504, and cycle through pairing the anchor antenna element with a respective discrete antenna element of the remaining N−1 discrete antenna elements to receive a respective portion of the downlink signal 502. To illustrate, and as shown by reference number 512, the UE 120 may receive a first portion of the downlink signal 502 using the anchor antenna element (e.g., the first discrete antenna element 504) and the second discrete antenna element 506 at time 1, a second portion of the downlink signal 502 using the anchor antenna element and the third discrete antenna element 508 at time 2, and/or a third portion of the downlink signal using the anchor antenna element and the fourth discrete antenna element 510 at time 3. Active antenna elements at a particular point in time (e.g., time 1, time 2, and time 3) are shown with a dotted pattern, and inactive antenna elements are shown in solid white. An i-th signal (e.g., an i-th symbol) received at the UE 120 may be represented according to an equation of the following form:

$$y_i^{Rx-j} = h^H f s + n_i^j \qquad (1)$$

where $$y_i^{Rx-j}$$

represents the received signal at the UE 120, h represents a channel vector from a network node to the UE side, f represents a network node beamforming vector, s represents a common symbol that is transmitted by the network node over symbols i=1 to N−1, j=0 or 1, and $$n_i^j$$

represents the noise in the received signal as observed by the UE 120 for symbol i. In some aspects, equation (1) may be used to determine a phase offset of an i-th antenna element that is relative to the anchor antenna element.

To illustrate, the phase of the anchor antenna element may be represented as:

$$\phi_1 = 0, \qquad (2)$$

and the phase offset of the i-th discrete antenna element, relative to the anchor antenna element, may be calculated as:

$$\phi_{i+1} = \angle y_i^{Rx-0} - \angle y_i^{Rx-1} \qquad (3)$$

for i=1 to N−1 symbols. In some aspects, equation (3) may be used to normalize the phase offset in reception. Accordingly, the UE 120 may derive a phase offset based at least in part on a downlink signal transmitted by the network node including a common symbol configuration (a common symbol value) across multiple time durations (e.g., multiple symbol durations).

In some aspects, the phase relationship shown by equation (3) may be valid for narrow bandwidth signals (e.g., a signal with a bandwidth that satisfies a narrowband threshold). For other signals, such as wideband signals (e.g., a signal with a bandwidth that fails to satisfy the narrowband threshold and/or satisfies a wideband threshold), the equation (2) may result in some inaccuracies in a phase offset calculation that reduce a coherence between discrete antenna elements. Accordingly, in some aspects, the UE 120 may evaluate, for a received symbol (e.g., an i-th symbol), K frequency samples, where K is an integer. To illustrate, the UE 120 may use the following equations:

$$y_{i,k}^{Rx-j} = h_k^H f s + n_{i,k}^j \quad (4)$$

$$\phi_1 = 0 \quad (2)$$

$$\phi_{i+1} = \frac{1}{K}\left(\sum_{k=1}^{K} \angle y_{i,k}^{Rx-0} - \angle y_{i,k}^{Rx-1}\right) \quad (5)$$

where $h_k$ represents the channel vector at frequency sample k, f represents a network node beamforming vector, s represents a common symbol that is transmitted by the network node over symbols i=1 to N−1, j=0 or 1, and $$n_{i,k}^j \quad$$

represents noise in the received signal as observed by the UE 120 for symbol i at frequency sample k. In some aspects, equation (5) may be used to determine a phase offset of an i-th antenna element that is relative to the anchor antenna element. Equation (5) illustrates a first statistical phase (e.g., an average) that may be calculated by the UE 120 using the K frequency samples of each symbol. However other statistical phases may be calculated by the UE 120 as well, such as a median statistical phase and/or a weighted average statistical phase. For instance, equation (5) may be modified based at least in part on channel estimations for particular resource blocks (RBs). To illustrate, an RB may include 12 resource elements (REs), and the UE may compute a channel estimation using a demodulation reference signal (DMRS) that is transmitted using at least some of the REs (e.g., REs allocated to the UE), and the UE may use the channel estimation to compute a phase adjustment and/or a phase offset.

In the example 500, the downlink signal 502 that is transmitted by the network node 110 spans N−1 symbol durations that may be used by the UE 120 to receive the downlink signal 502 using every distinct antenna element pairing combination with the anchor antenna element. In some aspects, however, the network node 110 may not grant N−1 symbols to the downlink signal 502. That is, the network node 110 may grant and/or transmit a downlink signal that spans fewer symbol durations than N−1 symbols. For a downlink signal that has a duration that is smaller than N−1 symbol durations, the UE 120 may select a subset of discrete antenna elements from the N discrete antenna elements and may perform the antenna coherence establishment procedure using the subset of discrete antenna elements. For instance, the UE 120 may select an anchor antenna element from the subset of discrete antenna elements and may receive a respective portion of a downlink signal using a respective discrete antenna element pairing with the anchor antenna element. The UE 120 may calculate a phase offset using any combination of equations as described above.

In some aspects, the UE 120 may select the anchor antenna element and/or a subset of discrete antenna elements based at least in part on one or more metrics. As one example, the UE 120 may calculate a respective power metric of each discrete antenna element in the N discrete antenna elements (e.g., using signaling prior to a downlink signal that is used for at least part of the antenna coherence establishment procedure), and select as an anchor antenna element a discrete antenna element with a strongest receive power metric out of the set of power metrics. Alternatively, or additionally, the UE 120 may select the subset of discrete antenna elements based at least in part on the respective power metrics (e.g., by selecting M discrete antenna elements with the M strongest power metrics, M being an integer that may be less than N). Other examples may include the UE 120 generating a Layer 1 filter of power over the discrete antenna elements, an average power, and/or a weighted power, to select the subset of discrete antenna elements. In some aspects the network node 110 may configure the L1 filter by indicating one or more parameters to the UE 120. In some aspects, a Layer 1 filter is a low pass filter of observed power metrics (e.g., RSRPs) over time resource and/or frequency resources. That is, the Layer 1 filter of power may be a filter of Layer 1 power metrics that results in a moving average of power, and the moving average of power may be used to select one or more discrete antenna elements.

In some aspects, the discrete antenna elements evaluated by the UE 120 for coherence establishment may be receive-only discrete antenna elements. To illustrate, in one scenario, the UE 120 may include four receive-only discrete antenna elements. Based at least in part on the discrete antenna elements being receive-only discrete antenna elements, the UE 120 may measure and/or calculate the antenna phase relationships (e.g., phase offset(s) between discrete antenna elements) using the above equations and a single symbol. To illustrate, the UE 120 may calculate multiple measurements in a single time and frequency resource (e.g., the single symbol), and the multiple measurements may provide a distinction and/or a diversity between discrete antenna elements that enables phase adjustment computations as described herein. The UE 120 may then apply the phase offset for subsequent reception (e.g., coordinated reception) that uses at least two discrete antenna elements.

While the example 500 shown by FIG. 5 includes a network node 110 and a UE 120 performing an antenna coherence establishment procedure using a downlink signal, other examples may use an uplink signal between the UE 120 and the network node 110 and/or sidelink signaling between two UEs. As one example, an uplink transmission by a UE may be characterized as:

$$y_i^{tx-j} = f^H h s + f^H n_i^j \quad (6)$$

where s represents a common symbol that is transmitted by the UE over symbols i=1 to N−1, j=0 or 1, and $$n_i^j$$

represents noise in the received signal as observed by the network node for symbol i. In some aspects, the UE 120 may iterate through pairings of discrete antenna elements with an anchor antenna element, such as a first pairing between an anchor antenna element (e.g., the first discrete antenna element 504) and the second discrete antenna element 506, a second pairing between the anchor antenna element and the third discrete antenna element 508, and/or a third pairing between the anchor antenna element and a fourth discrete antenna element 510. That is, the UE 120 may iterate through transmitting portions of an uplink signal using different pairings for respective time durations. In a similar manner as a downlink antenna coherence establishment procedure that is based at least in part on a downlink signal, the UE 120 may select, for an uplink antenna coherence establishment procedure, a subset of discrete antennas to use for transmitting an uplink signal (or a sidelink signal), such as by selecting the subset of discrete antenna elements based at least in part on one or metrics (e.g., a power metric). To illustrate, in a scenario that includes the UE 120 receiving an uplink grant that includes fewer symbols than N−1 symbols, the UE 120 may select a subset of discrete antenna elements based at least in part on a size of the uplink grant, such as by selecting a number of discrete antenna elements that may be used to form a number of distinct antenna pairs that is equal to a number of symbol durations in the uplink grant. Alternatively, or additionally, the UE 120 may select the anchor antenna element based at least in part on a metric.

The network node 110 may receive the uplink signal from the UE 120 and calculate relative phase differences (e.g., relative phase offsets) between the transmissions. For example, the network node may generate a first relative phase difference using a first portion of the uplink signal that is received during a first time duration, a second relative phase difference using a second portion of the uplink signal that is received during a second time duration, and/or a third relative phase difference using a third portion of the uplink signal. To illustrate, the network node 110 may perform similar calculations as described with regard to equation (2) and equation (3), replacing the downlink transmission representation of these equations (e.g., $$y_i^{Rx-j})$$

with the uplink transmission representation shown by equation (6) (e.g., $$y_i^{tx-j}),$$

such as for a narrowband signal and/or may indicate a computed value to the UE 120. Alternatively, or additionally, for a wideband signal, the network node 110 may perform similar calculations as described with regard to equation (5) by generating multiple relative phase differences over multiple frequency samples and generating a statistical phase using the multiple relative phase differences.

The network node 110 may transmit an indication of the relative phase difference(s) to the UE 120 in any combination of Layer 1 signaling, Layer 2 signaling, and/or Layer 3 signaling, and the UE 120 may use the relative phase differences to calculate a phase offset that enables coherence between discrete antenna elements. In some aspects, the network node 110 may transmit an indication of the relative phase differences in a quantized manner. For instance, the network node 110 may indicate a set of quantized phase differences, such as a table that includes a variety of relative phase differences, and may indicate selection of a particular relative phase difference in the table that is close to the relative phase difference calculated by the network node 110. As another example, the network node may transmit a bit field that includes multiple bits, where each bit of the bit field maps to a respective relative phase difference. Accordingly, the network node 110 may set a particular bit within the bit field to a first value (e.g., "1") that indicates selection of that bit field and/or may set the remaining bits of the bit field to a second value (e.g., "0") to indicate that the remaining bits are not selected. The use of a quantized phase difference may reduce signaling overhead used by the network node 110 to indicate the relative phase differences.

Alternatively, or additionally, the network node 110 may indicate a measure of coherence that enables the UE 120 to derive an expected array gain for uplink transmissions that use discrete antenna elements in combination. For instance, the network node 110 may indicate, and/or a communication standard may specify, one or more coherence thresholds, such as a first coherence threshold that is configured as a low coherence threshold (e.g., a low uplink coherence threshold and/or a low sidelink coherence threshold) and/or a second coherence threshold that is configured as a high coherence threshold (e.g., a high uplink coherence threshold and/or a high sidelink coherence threshold). The network node 110 may indicate a measure of coherence based at least in part on the coherence threshold(s), such as by indicating a first value that satisfies the high uplink coherence threshold to indicate a full coherence, a second value that fails to satisfy the high uplink coherence threshold and satisfies the low uplink coherence threshold to indicate partial coherence, and/or a third value that fails to satisfy the high uplink coherence threshold and fails to satisfy the low uplink coherence threshold to indicate low coherence and/or no coherence.

A UE performing an antenna coherence establishment procedure (e.g., with a network node and/or another UE) may enable the coordinated use of discrete antenna elements, such as in a combined manner that increases an array gain as described above. The use of signaling in the antenna coherence establishment procedure, such as a downlink signal, an uplink signal, and/or a sidelink signal, may enable the UE to dynamically compute phase differences between the discrete antenna elements based at least in part on a current operating state of the UE, such as a current state of one or more RF chains, LOs, thermal transients, and/or antenna placements relative to current communication wavelength(s). Dynamically obtaining phase differences may enable the UE to compensate for differences between the discrete antenna elements, such as by applying a respective phase offset to a respective signal processed by a respective discrete antenna element (e.g., transmitted and/or received), resulting in increased consistency and/or increased reliability in a coherence between the discrete antenna elements, an increased array gain, and/or an increased signal quality (e.g., power level). The increased array gain and/or increased signal quality may lead to reduced data recovery errors, reduced data transfer latencies, and/or increased data throughput in a wireless network.

As indicated above, FIG. 5 is provided as an example. Other examples may differ from what is described with regard to FIG. 5.

Figure 6:
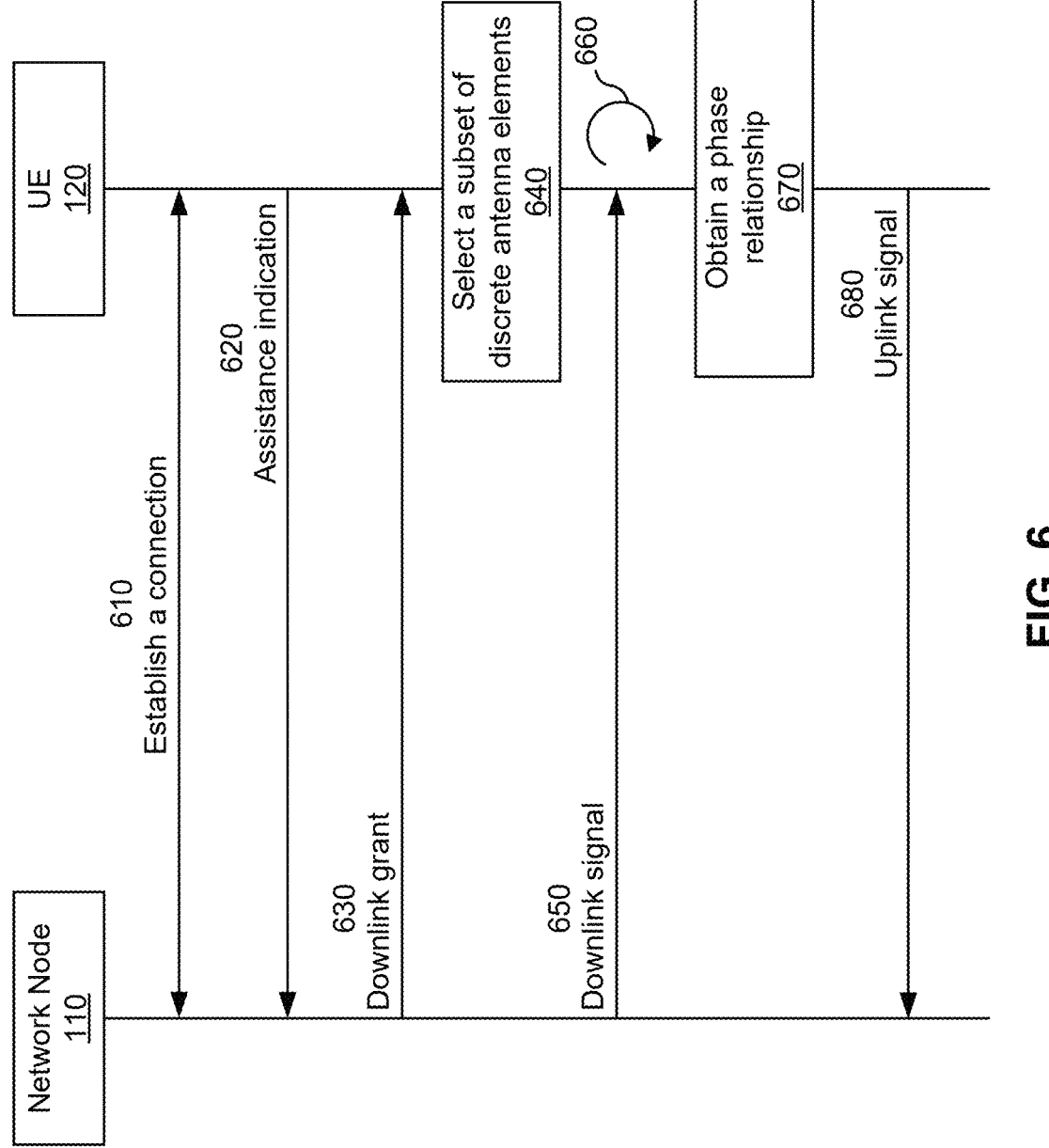
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure. While the example 600 describes signaling between a network node and a UE (e.g., downlink signaling and/or uplink signaling), other examples may utilize aspects of the example 600 based at least in part on a first UE, a second UE, and sidelink signaling.

As shown by reference number 610, a network node 110 and a UE 120 may establish a connection. To illustrate, the UE 120 may power up in a cell coverage area provided by the network node 110, and the UE 120 and the network node 110 may perform one or more procedures (e.g., a random access channel (RACH) procedure and/or an RRC procedure) to establish a wireless connection. As another example, the UE 120 may move into the cell coverage area provided by the network node 110 and may perform a handover from a source network node (e.g., another network node 110) to the network node 110. Alternatively, or additionally, the network node 110 and the UE 120 may communicate via the connection based at least in part on any combination of Layer 1 signaling (e.g., downlink control information (DCI) and/or uplink control information (UCI)), Layer 2 signaling (e.g., a MAC control element (CE)), and/or Layer 3 signaling (e.g., RRC signaling). To illustrate, the network node 110 may request, via RRC signaling, UE capability information and/or the UE 120 may transmit, via RRC signaling, the UE capability information. As part of communicating via the connection, the network node 110 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 110 may transmit the configuration information via Layer 3 signaling at a first point in time associated with the UE being tolerant of communication delays, and the network node 110 may transmit an activation of the configuration via Layer 2 signaling and/or Layer 1 signaling at a second point in time associated with the UE being intolerant to communication delays.

In some aspects, and as part of establishing the connection with the network node 110, the UE 120 may indicate a UE capability that is associated with a discrete antenna element, such as a number of discrete antenna elements included in the UE 120, discrete antenna types (e.g., receive-only, transmit-only, and/or transmit and receive), and/or support for performing an antenna coherence establishment procedure (e.g., a downlink antenna coherence establishment procedure and/or an uplink antenna coherence establishment procedure). Alternatively, or additionally, the network node 110 may indicate, as part of establishing the connection with the UE 120, configuration information for an antenna coherence establishment procedure, such as a table of quantized phase differences.

As shown by reference number 620, the UE 120 may transmit, and the network node 110 may receive, an assistance indication. In some aspects, the assistance indication may specify and/or indicate a request for antenna coherence assistance that enables the UE 120 to configure two or more discrete antenna elements with a coherence that satisfies a coherence threshold (e.g., a coherence threshold that is based at least in part on reliable uplink coherence using discrete antenna elements and/or a coherence threshold that is based at least in part on a measure of coherence). The UE 120 may transmit the assistance indication in Layer 1 signaling, Layer 2 signaling, and/or Layer 3 signaling.

As shown by reference number 630, the network node 110 may transmit, and the UE 120 may receive, an indication of a downlink grant. In some aspects, the downlink grant may be based at least in part on a UE capability that is associated with a discrete antenna element. For instance, based at least in part on the UE 120 including N discrete antenna elements, the downlink grant may include N−1 symbols to enable the UE 120 to receive the downlink signal using all possible discrete pairings of the discrete antenna elements. However, the downlink grant may alternatively indicate fewer than N−1 symbols, such as in a scenario where the network node 110 is servicing a high load of UEs and/or is near full capacity, to preserve air interface resources for other UEs. As one example, the downlink grant may be based at least in part on the UE 120 using a subset of discrete antenna elements and/or may be based at least in part on a single symbol (e.g., for receive-only discrete antenna element types). In some aspects, the downlink grant may be assigned for a downlink signal that is part of an antenna coherence establishment procedure as described with regard to FIG. 5.

As shown by reference number 640, the UE 120 may select a subset of discrete antenna elements. To illustrate, and as described with regard to FIG. 5, the UE 120 may select the subset of discrete antenna elements from N discrete antenna elements based at least in part on a respective power metric of each discrete antenna element. The respective power metric may be based at least in part on an average, a weighted average or a Layer 1 filter of power that uses an entirety of the N discrete antenna elements. Alternatively, or additionally, the UE 120 may select a particular discrete antenna element (e.g., from the N discrete antenna elements) as an anchor antenna element, such as by selecting the particular discrete antenna element that is associated with a highest power metric for the N discrete antenna elements.

While the example 600 includes the UE 120 selecting a subset of discrete antenna elements, other examples may not include the UE 120 selecting a subset of discrete antenna elements. That is, the UE 120 may determine to perform an antenna coherence establishment procedure using all N discrete antenna elements, instead of a subset of the N discrete antenna elements (e.g., fewer discrete antenna elements than the N discrete antenna elements).

As shown by reference number 650, the network node 110 may transmit, and the UE 120 may receive, a downlink signal. For clarity, FIG. 6 shows the network node 110 transmitting the indication of the downlink grant separately from the transmission of the downlink signal, but other examples may include the indication of the downlink grant being included in a same transmission as the downlink signal. In some aspects, the network node 110 may transmit the downlink signal as a narrowband signal (e.g., a signal that has a bandwidth that satisfies a narrowband threshold and/or fails to satisfy a wideband threshold), while in other aspects, the network node 110 may transmit the downlink signal as a wideband signal (e.g., a signal that has a bandwidth that satisfies the wideband threshold and/or fails to satisfy the narrowband threshold). As described with regard to reference number 630, the downlink signal may use and/or occupy a number of symbols that is based at least in part on the UE 120 including N discrete antenna elements, the UE 120 using a subset of the N discrete antenna elements, and/or a single symbol.

As shown by reference number 660, the UE 120 may iteratively receive portions of the downlink signal using respective pairs of discrete antenna elements. To illustrate, the UE 120 may select an anchor antenna element and iteratively pair the anchor antenna element with a respective discrete antenna element of the N discrete antenna elements that is not the anchor antenna element to receive a portion of the downlink signal. Each portion of the downlink signal that is received with a distinct pair of discrete antenna elements may span a respective symbol of the downlink signal. The UE 120 may receive the downlink signal using all of the N discrete antenna elements, or may receive the downlink signal using fewer discrete antenna elements than the N discrete antenna elements (e.g., a subset of the N discrete antenna elements).

As shown by reference number 670, the UE 120 may obtain one or more phase relationships between the anchor antenna element and one or more discrete antenna elements at the UE. For example, the UE 120 may compute a phase relationship as described with regard to FIG. 5 using the received portions of the downlink signal. To illustrate, the UE 120 may compute a phase relationship between a pair of discrete antenna elements using a portion of a narrowband downlink signal and the equation (3). As another example, the UE 120 may compute the phase relationship between a pair of discrete antenna elements using a portion of a wideband downlink signal, multiple frequency samples, and the equation (5) (e.g., computing the respective phase relationship using the multiple phase estimations and/or generating an average of the multiple phase estimations). In some aspects, the UE 120 may compute phase relationships for multiple pairs of discrete antenna elements using a single symbol of a received downlink signal, such as in a scenario that includes the discrete antenna elements being receive-only antenna elements.

As shown by reference number 680, the UE 120 may transmit, and the network node may receive, an uplink signal. In some aspects, the uplink signal may be based at least in part on the phase offset(s). For example, the UE 120 may transmit the uplink signal using at least two of the discrete antenna elements in a coordinated manner (e.g., an array), and adjusting an input signal to a discrete antenna element using the phase relationship, such as by applying and/or adjusting a phase offset of the input signal.

An antenna coherence establishment procedure may enable a UE to use discrete antenna elements in a coordinated manner, such as an antenna array that increases an array gain as described above. The antenna coherence establishment procedure may enable the UE to dynamically obtain phase differences between discrete antenna elements, such as phase differences due to different hardware paths, and/or apply a respective phase offset to a respective signal processed by a respective discrete antenna element to increase a reliability in a coherence between the discrete antenna elements. Increasing a reliability in a coherence between discrete antenna elements may result in an increased array gain and/or an increased signal quality (e.g., power level), reduced data recovery errors, reduced data transfer latencies, and/or increased data throughput in a wireless network.

As indicated above, FIG. 6 is provided as an example. Other examples may differ from what is described with regard to FIG. 6.

Figure 7:
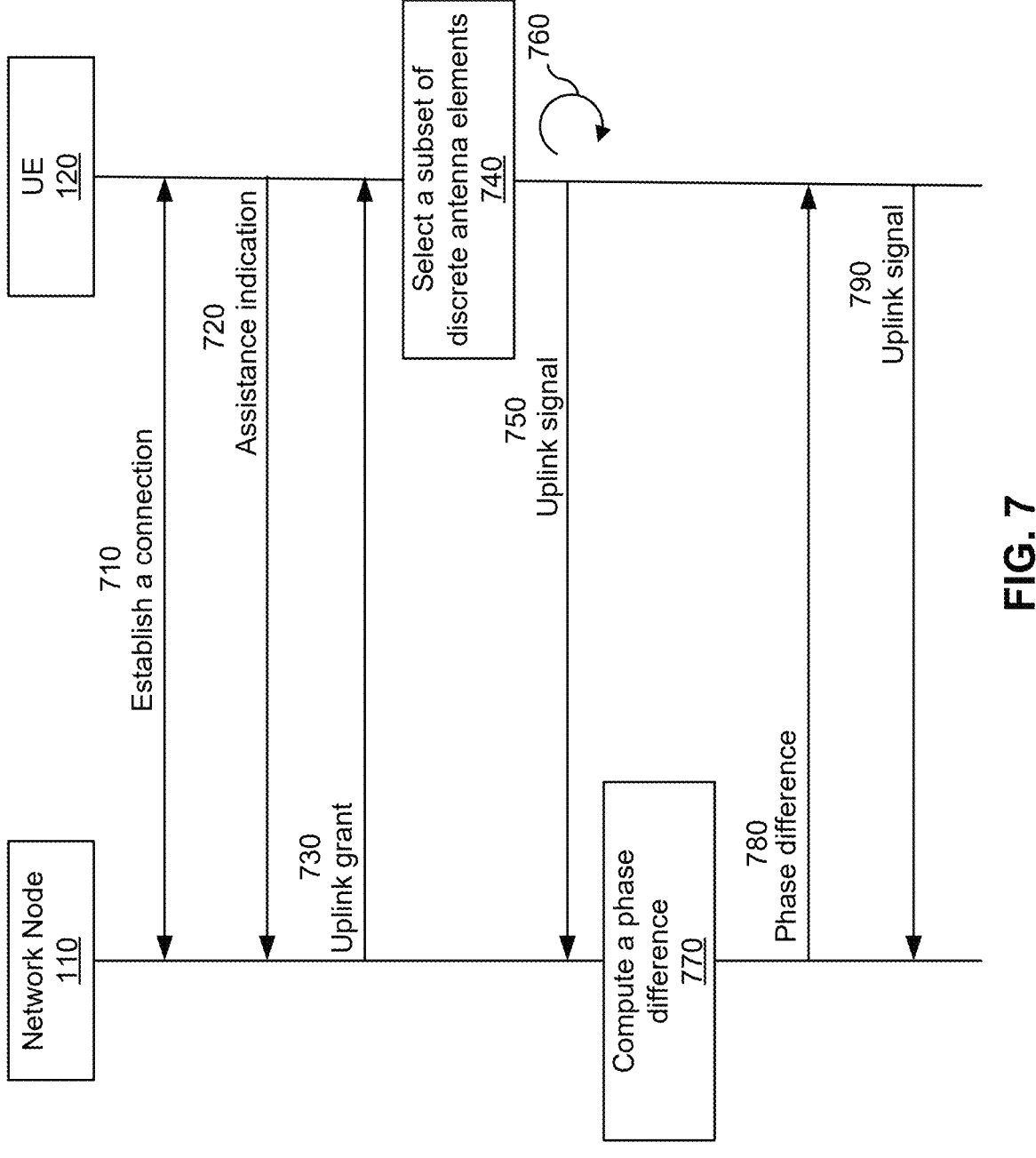
FIG. 7 is a diagram illustrating an example of a wireless communication process between a network node and a UE, in accordance with the present disclosure.

FIG. 7 is a diagram illustrating an example 700 of a wireless communication process between a network node (e.g., the network node 110) and a UE (e.g., the UE 120), in accordance with the present disclosure. One or more aspects of the example 700 may be combined with one or more aspects of the example 600. While the example 700 describes signaling between a network node and a UE (e.g., downlink signaling and/or uplink signaling), other examples may utilize aspects of the example 700 based at least in part on a first UE, a second UE, and sidelink signaling.

As shown by reference number 710, a network node 110 and a UE 120 may establish a connection. For example, the network node 110 and the UE 120 may establish the connection in a similar manner as described with regard to reference number 610.

As shown by reference number 720, the UE 120 may transmit, and the network node 110 may receive, an assistance indication that is associated with a request for antenna coherence assistance. To illustrate, the UE 120 may transmit the assistance indication in a similar manner as described with regard to reference number 620.

As shown by reference number 730, the network node 110 may transmit, and the UE 120 may receive, an indication of an uplink grant, and the uplink grant may be assigned for an uplink signal that is part of an antenna coherence establishment procedure as described with regard to FIG. 5. In some aspects, the uplink grant may be based at least in part on a UE capability that is associated with a discrete antenna element. For instance, based at least in part on the UE 120 including N discrete antenna elements, the uplink grant may be based at least in part on N–1 time durations (e.g., N–1 symbol durations) to enable the UE 120 to transmit the uplink signal using all possible pairings of the discrete antenna elements, such as by transmitting a respective portion of the uplink signal using a respective antenna pairing. However, the uplink grant may alternatively be based at least in part on fewer than N–1 time durations, such as in a scenario where the network node 110 is servicing a high load of UEs and/or near full capacity, to preserve air interface resources for other UEs.

As shown by reference number 740, the UE 120 may select a subset of discrete antenna elements. For instance, the UE 120 may select the subset of discrete antenna elements in a similar manner as described with regard to reference number 650. While the example 700 includes the UE 120 selecting a subset of discrete antenna elements, other examples may not include the UE 120 selecting a subset of discrete antenna elements.

As shown by reference number 750, the UE 120 may transmit, and the network node 110 may receive, an uplink signal. As shown by reference number 760, the UE 120 may transmit the uplink signal based at least in part on iteratively changing the discrete antenna element pairs used to transmit the uplink signal. As one example, the UE 120 may transmit each respective portion of the uplink signal for a respective time duration using a respective antenna pair that includes an anchor antenna element and a respective discrete antenna element of the N discrete antenna elements (e.g., that is not the anchor antenna element). As another example, the UE may transmit the uplink signal by iteratively changing the discrete antenna element pairs in a subset of discrete antenna elements, such as by transmitting each respective portion of the uplink signal using the anchor antenna element and a respective discrete antenna element from the subset. Accordingly, the UE 120 may perform the antenna coherence establishment procedure by transmitting an uplink signal using a subset of discrete antenna elements from N discrete antenna elements, or all N discrete antenna elements. Alternatively, or additionally, the network node 110 may perform the antenna coherence establishment procedure by receiving multiple portions of the uplink signal in multiple time durations. In a similar manner as the downlink signal described with regard to FIG. 6, the uplink signal transmitted by the UE 120 may be a narrowband signal or a wideband signal.

As shown by reference number 770, the network node 110 may compute a phase difference. For example, the network node 110 may calculate a phase difference between a first portion of the uplink signal and a second portion of the multiple portions. In some aspects, the uplink signal may be a wideband signal, and the network node 110 may calculate the phase difference using a set of phase samples. To illustrate, the network node 110 may calculate a first set of phase samples (e.g., using a first set of frequency samples) for a first portion of the uplink signal and a second set of phase samples (e.g., using a second set of frequency samples) for a second portion of the uplink signal. The network node 110 may subsequently calculate a set of phase differences using the first set of phase samples and the second set of phase samples, and compute an estimated phase difference between the first portion of the uplink signal and the second portion of the uplink signal using the set of phase differences. For example, the network node 110 may compute an average phase difference using the set of phase differences.

As shown by reference number 780, the network node 110 may transmit, and the UE 120 may receive, an indication of one or more phase differences and/or phase relationships, and the phase difference(s) and/or phase relationships(s) may be based at least in part on different portions of the uplink signal. The network node 110 may indicate the phase difference(s) and/or phase relationship(s) in Layer 1 signaling, Layer 2 signaling, and/or Layer 3 signaling. In some aspects, the network node 110 may indicate the relative phase difference(s) by indicating quantized phase difference value(s) as described with regard to FIG. 5. Alternatively, or additionally, the network node 110 may indicate, as a phase relationship, a measure of uplink coherence (e.g., between portions of the uplink signal). The network node 110 may indicate the measure of uplink coherence using a low uplink coherence threshold and/or a high uplink coherence threshold. The low uplink coherence threshold and the high uplink coherence threshold may be used jointly to indicate full uplink coherence, partial uplink coherence, and/or no uplink coherence as described with regard to FIG. 5.

As shown by reference number 790, the UE 120 may transmit, and the network node 110 may receive, an uplink signal, and the uplink signal may be based at least in part on the phase difference indicated by the network node 110. For example, the UE 120 may use the phase difference to derive one or more phase offsets between discrete antenna element pairs, and may transmit the uplink signal using the phase offset(s) in a similar manner as described with regard to reference number 680.

An antenna coherence establishment procedure may enable a UE to use discrete antenna elements in a coordinated manner, such as an antenna array that increases an array gain as described above. The antenna coherence establishment procedure may enable the UE to dynamically obtain phase differences between discrete antenna elements, such as phase differences due to different hardware paths, and/or apply a respective phase offset to a respective signal processed by a respective discrete antenna element to increase a reliability in a coherence between the discrete antenna elements. Increasing a reliability in a coherence between discrete antenna elements may result in an increased array gain and/or an increased signal quality (e.g., power level), reduced data recovery errors, reduced data transfer latencies, and/or increased data throughput in a wireless network.

As indicated above, FIG. 7 is provided as an example. Other examples may differ from what is described with regard to FIG. 7.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with enabling uplink coherence with discrete antenna elements via signaling.

As shown in FIG. 8, in some aspects, process 800 may include transmitting an assistance indication that requests antenna coherence assistance to configure two or more discrete antenna elements with a coherence that satisfies a coherence threshold (block 810). For example, the UE (e.g., using transmission component 1004 and/or communication manager 1006, depicted in FIG. 10) may transmit an assistance indication that requests antenna coherence assistance to configure two or more discrete antenna elements with a coherence that satisfies a coherence threshold, as described above.

As further shown in FIG. 8, in some aspects, process 800 may include performing, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements (block 820). For example, the UE (e.g., using communication manager 1006, depicted in FIG. 10) may perform, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements, as described above.

Process 800 may include additional aspects, such as any single aspect or any combination of aspects described below and/or in connection with one or more other processes described elsewhere herein.

In a first aspect, the two or more discrete antenna elements include N discrete antenna elements, N being an integer, wherein the signaling comprises a downlink signal, and wherein performing the antenna coherence establishment procedure comprises receiving, for each respective discrete antenna element of the N discrete antenna elements that is not the anchor antenna element, a respective symbol of the downlink signal using a respective antenna pair that includes the anchor antenna element and the respective discrete antenna element.

In a second aspect, the downlink signal is a narrowband signal that has a bandwidth that satisfies a narrowband threshold.

In a third aspect, the downlink signal is a wideband signal that has a bandwidth that satisfies a wideband threshold, and obtaining the respective phase relationship between the anchor antenna element and the at least second discrete antenna element comprises computing multiple phase estimations using multiple samples of the respective symbol, and computing the respective phase relationship using the multiple phase estimations.

In a fourth aspect, computing the respective phase relationship comprises computing the respective phase relationship as an average of the multiple phase estimations.

In a fifth aspect, the two or more discrete antenna elements include N discrete antenna elements, N being an integer that is greater than two, and performing the antenna coherence establishment procedure comprises performing the antenna coherence establishment procedure using a subset of discrete antenna elements from the N discrete antenna elements.

In a sixth aspect, process 800 includes selecting the subset of discrete antenna elements from the N discrete antenna elements based at least in part on a respective power metric of each discrete antenna element in the N discrete antenna elements.

In a seventh aspect, the respective power metric is based at least in part on an average, a weighted average or a Layer 1 filter of power over the N discrete antenna elements.

In an eighth aspect, process 800 includes selecting a particular discrete antenna element from the N discrete antenna elements as the anchor antenna element based at least in part on the respective power metric of the particular discrete antenna element being a highest power metric for the N discrete antenna elements.

In a ninth aspect, the two or more discrete antenna elements include four discrete antenna elements, wherein performing the antenna coherence establishment procedure comprises computing the respective phase relationship for each respective antenna pair using a single symbol.

In a tenth aspect, the two or more discrete antenna elements include N discrete antenna elements, N being an integer, wherein the signaling comprises an uplink signal, and wherein performing the antenna coherence establishment procedure comprises transmitting, for each respective discrete antenna element of the N discrete antenna elements that is not the anchor antenna element, a respective time duration of the uplink signal using a respective antenna pair that includes the anchor antenna element and the respective discrete antenna element.

In an eleventh aspect, obtaining the respective phase relationship between the anchor antenna element and the at least second discrete antenna element comprises receiving an indication of the respective phase relationship from a network node.

In a twelfth aspect, the indication of the respective phase relationship specifies a relative phase difference.

In a thirteenth aspect, the indication of the relative phase difference is based at least in part on multiple quantized phase difference values.

In a fourteenth aspect, the indication of the respective phase relationship comprises a measure of uplink coherence.

In a fifteenth aspect, the measure of uplink coherence is based at least in part on at least one of a low uplink coherence threshold, or a high uplink coherence threshold.

In a sixteenth aspect, the measure of uplink coherence comprises at least one of full uplink coherence, partial uplink coherence, or no uplink coherence.

In a seventeenth aspect, the two or more discrete antenna elements include N discrete antenna elements, N being an integer that is greater than two, wherein the signaling comprises an uplink signal, and wherein performing the antenna coherence establishment procedure comprises performing the antenna coherence establishment procedure using a subset of discrete antenna elements from the N discrete antenna elements to transmit the uplink signal.

In an eighteenth aspect, process 800 includes selecting the subset of discrete antenna elements from the N discrete antenna elements based at least in part on a respective power metric of each discrete antenna element in the N discrete antenna elements.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
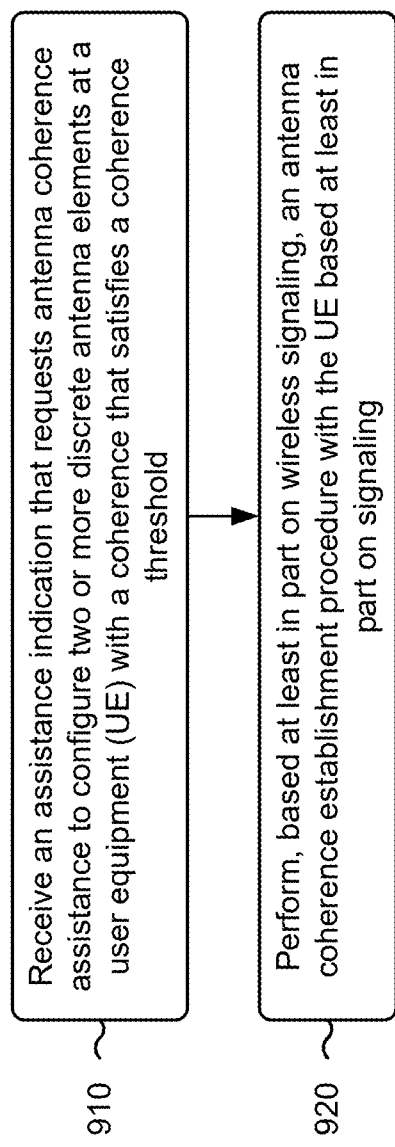
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with enabling uplink coherence with discrete antenna elements via signaling.

As shown in FIG. 9, in some aspects, process 900 may include receiving an assistance indication that requests antenna coherence assistance to configure two or more discrete antenna elements at a UE with a coherence that satisfies a coherence threshold (block 910). For example, the network node (e.g., using reception component 1102 and/or communication manager 1106, depicted in FIG. 11) may receive an assistance indication that requests antenna coherence assistance to configure two or more discrete antenna elements at a UE with a coherence that satisfies a coherence threshold, as described above.

As further shown in FIG. 9, in some aspects, process 900 may include performing, based at least in part on wireless signaling, an antenna coherence establishment procedure with the UE based at least in part on signaling (block 920). For example, the network node (e.g., using communication manager 1106, depicted in FIG. 11) may perform, based at least in part on wireless signaling, an antenna coherence establishment procedure with the UE based at least in part on signaling, as described above.

Process 900 may include additional aspects, such as any single aspect or any combination of aspects described below and/or in connection with one or more other processes described elsewhere herein.

In a first aspect, the two or more discrete antenna elements include N discrete antenna elements, N being an integer, the signaling is a downlink signal, and performing the antenna coherence establishment procedure includes transmitting the downlink signal using a number of symbols that is based at least in part on the N discrete antenna elements.

In a second aspect, the downlink signal is a narrowband signal that has a bandwidth that satisfies a narrowband threshold.

In a third aspect, the downlink signal is a wideband signal that has a bandwidth that satisfies a wideband threshold.

In a fourth aspect, the number of symbols is one symbol fewer than N symbols.

In a fifth aspect, the number of symbols is two or more symbols fewer than N symbols.

In a sixth aspect, the number of symbols is one.

In a seventh aspect, the two or more discrete antenna elements includes N discrete antenna elements, N being an integer, the signaling is an uplink signal, and performing the antenna coherence establishment procedure includes receiving multiple portions of the uplink signal in multiple time durations, each respective portion of the multiple portions being received in a respective time duration of the multiple time durations, the multiple time durations being fewer than N time durations.

In an eighth aspect, the multiple time durations are based at least in part on a subset of the N discrete antenna elements.

In a ninth aspect, process 900 includes calculating a phase difference between a first portion of the multiple portions of the uplink signal and at least a second portion of the multiple portions, and transmitting an indication of the phase difference.

In a tenth aspect, the indication of the phase difference is based at least in part on multiple quantized phase difference values.

In an eleventh aspect, the indication of the phase difference specifies a measure of uplink coherence.

In a twelfth aspect, the measure of uplink coherence is based at least in part on at least one of a low uplink coherence threshold, or a high uplink coherence threshold.

In a thirteenth aspect, the measure of uplink coherence specifies at least one of full uplink coherence, partial uplink coherence, or no uplink coherence.

In a fourteenth aspect, the uplink signal is a wideband signal that has a bandwidth that satisfies a wideband threshold, and process 900 includes calculating a first set of phase samples for a first portion of the multiple portions of the uplink signal, calculating a second set of phase samples for a second portion of the multiple portions of the uplink signal, calculating a set of phase differences using the first set of phase samples and the second set of phase samples, computing an estimated phase difference between the first portion and the second portion using the set of phase differences, and transmitting an indication of the estimated phase difference.

In a fifteenth aspect, computing the estimated phase difference includes computing an average phase difference using the set of phase differences.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
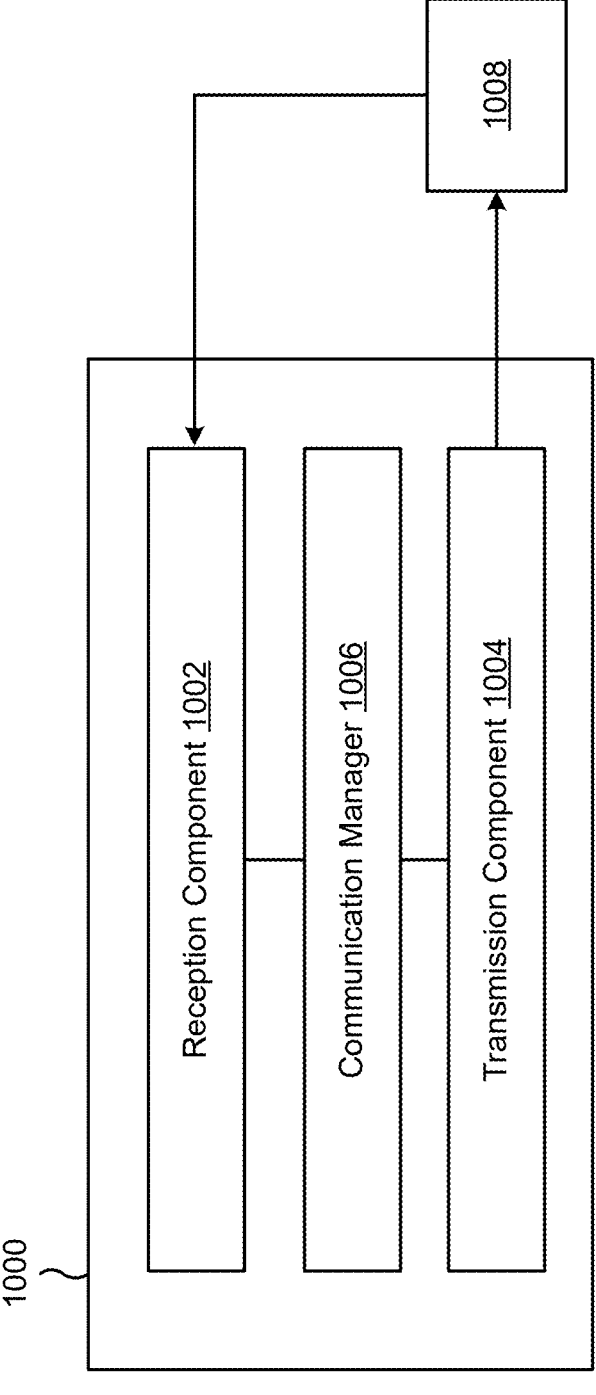
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit an assistance indication that requests antenna coherence assistance to configure two or more discrete antenna elements with a coherence that satisfies a coherence threshold. The communication manager 1006 may perform, based at least in part on signaling, an antenna coherence establishment procedure that is based at least in part on using a first discrete antenna element of the two or more discrete antenna elements as an anchor antenna element, and obtaining a respective phase relationship between the anchor antenna element and at least a second discrete antenna element of the two or more discrete antenna elements.

The communication manager 1006 may select a particular discrete antenna element from the N discrete antenna elements as the anchor antenna element based at least in part on the respective power metric of the particular discrete antenna element being a highest power metric for the N discrete antenna elements.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
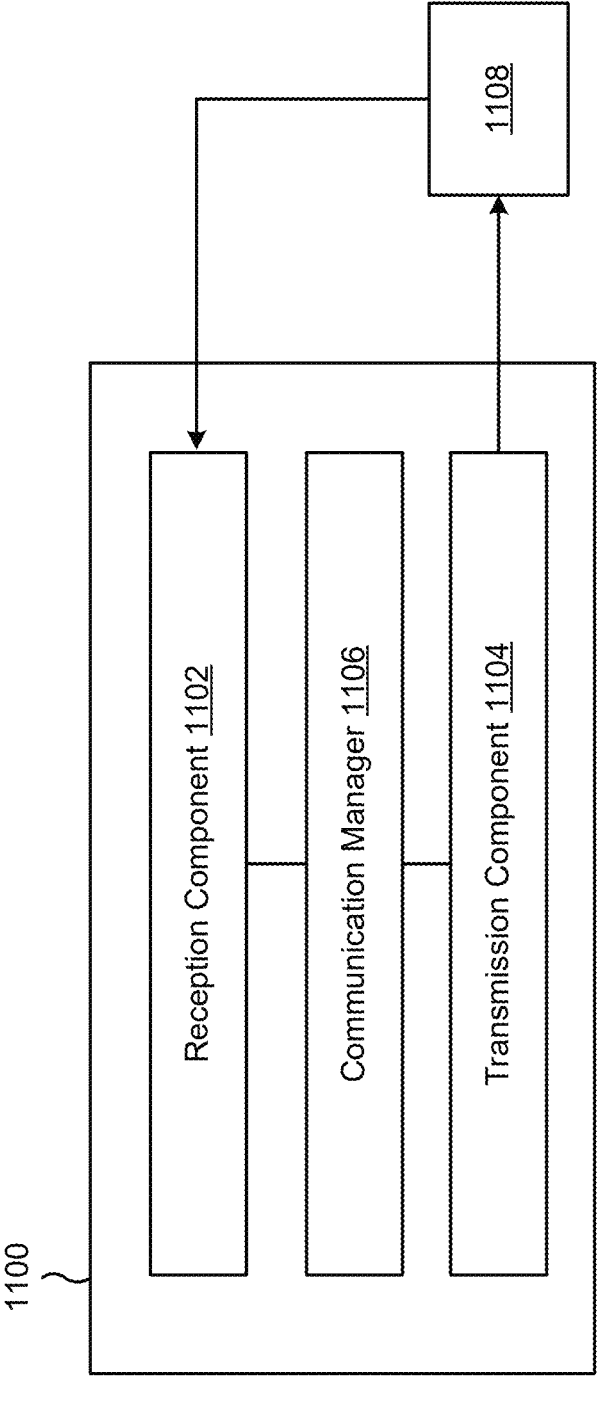
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive an assistance indication that requests antenna coherence assistance to configure two or more discrete antenna elements at a UE with a coherence that satisfies a coherence threshold. The communication manager 1106 may perform, based at least in part on wireless signaling, an antenna coherence establishment procedure with the UE based at least in part on signaling.

The communication manager 1106 may calculate a phase difference between a first portion of the multiple portions of the uplink signal and at least a second portion of the multiple portions. In some aspects, the transmission component 1104 may transmit an indication of the phase difference.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting an assistance indication that requests antenna coherence assistance to configure two or more discrete antenna elements with a coherence that satisfies a coherence threshold; and performing, based at least in part on signaling, an antenna coherence establishment procedure that is based at least in part on: using a first discrete antenna element of the two or more discrete antenna elements as an anchor antenna element, and obtaining a respective phase relationship between the anchor antenna element and at least a second discrete antenna element of the two or more discrete antenna elements.

Aspect 2: The method of Aspect 1, wherein the two or more discrete antenna elements include N discrete antenna elements, N being an integer, wherein the signaling comprises a downlink signal, and wherein performing the antenna coherence establishment procedure comprises: receiving, for each respective discrete antenna element of the N discrete antenna elements that is not the anchor antenna element, a respective symbol of the downlink signal using a respective antenna pair that includes the anchor antenna element and the respective discrete antenna element.

Aspect 3: The method of Aspect 2, wherein the downlink signal is a narrowband signal that has a bandwidth that satisfies a narrowband threshold.

Aspect 4: The method of Aspect 2, wherein the downlink signal is a wideband signal that has a bandwidth that satisfies a wideband threshold, and wherein obtaining the respective phase relationship between the anchor antenna element and the at least second discrete antenna element comprises: computing multiple phase estimations using multiple samples of the respective symbol; and computing the respective phase relationship using the multiple phase estimations.

Aspect 5: The method of Aspect 4, wherein computing the respective phase relationship comprises: computing the respective phase relationship as an average of the multiple phase estimations.

Aspect 6: The method of any of Aspects 1-5, wherein the two or more discrete antenna elements include N discrete antenna elements, N being an integer that is greater than two, and wherein performing the antenna coherence establishment procedure comprises: performing the antenna coherence establishment procedure using a subset of discrete antenna elements from the N discrete antenna elements.

Aspect 7: The method of Aspect 6, wherein the method further comprises: selecting the subset of discrete antenna elements from the N discrete antenna elements based at least in part on a respective power metric of each discrete antenna element in the N discrete antenna elements.

Aspect 8: The method of Aspect 7, wherein the respective power metric is based at least in part on an average, a weighted average or a Layer 1 filter of power over the N discrete antenna elements.

Aspect 9: The method of any of Aspects 1-8, further comprising: selecting a particular discrete antenna element from the N discrete antenna elements as the anchor antenna element based at least in part on the respective power metric of the particular discrete antenna element being a highest power metric for the N discrete antenna elements.

Aspect 10: The method of any of Aspects 1-9, wherein the two or more discrete antenna elements include four discrete antenna elements, wherein performing the antenna coherence establishment procedure comprises: computing the respective phase relationship for each respective antenna pair using a single symbol.

Aspect 11: The method of any of Aspects 1-10, wherein the two or more discrete antenna elements include N discrete antenna elements, N being an integer, wherein the signaling comprises an uplink signal, and wherein performing the antenna coherence establishment procedure comprises: transmitting, for each respective discrete antenna element of the N discrete antenna elements that is not the anchor antenna element, a respective time duration of the uplink signal using a respective antenna pair that includes the anchor antenna element and the respective discrete antenna element.

Aspect 12: The method of Aspect 11, wherein obtaining the respective phase relationship between the anchor antenna element and the at least second discrete antenna element comprises: receiving an indication of the respective phase relationship from a network node.

Aspect 13: The method of Aspect 12, wherein the indication of the respective phase relationship specifies a relative phase difference.

Aspect 14: The method of Aspect 13, wherein the indication of the relative phase difference is based at least in part on multiple quantized phase difference values.

Aspect 15: The method of Aspect 12, wherein the indication of the respective phase relationship comprises a measure of uplink coherence.

Aspect 16: The method of Aspect 15, wherein the measure of uplink coherence is based at least in part on at least one of: a low uplink coherence threshold, or a high uplink coherence threshold.

Aspect 17: The method of Aspect 16, wherein the measure of uplink coherence comprises at least one of: full uplink coherence, partial uplink coherence, or no uplink coherence.

Aspect 18: The method of any of Aspects 1-17, wherein the two or more discrete antenna elements include N discrete antenna elements, N being an integer that is greater than two, wherein the signaling comprises an uplink signal, and wherein performing the antenna coherence establishment procedure comprises: performing the antenna coherence establishment procedure using a subset of discrete antenna elements from the N discrete antenna elements to transmit the uplink signal.

Aspect 19: The method of Aspect 18, wherein the method further comprises: selecting the subset of discrete antenna elements from the N discrete antenna elements based at least in part on a respective power metric of each discrete antenna element in the N discrete antenna elements.

Aspect 20: A method of wireless communication performed by a network node, comprising: receiving an assistance indication that requests antenna coherence assistance to configure two or more discrete antenna elements at a user equipment (UE) with a coherence that satisfies a coherence threshold; and performing, based at least in part on wireless signaling, an antenna coherence establishment procedure with the UE based at least in part on signaling.

Aspect 21: The method of Aspect 20, wherein the two or more discrete antenna elements include N discrete antenna elements, N being an integer, wherein the signaling comprises a downlink signal, and wherein performing the antenna coherence establishment procedure comprises:

transmitting the downlink signal using a number of symbols that is based at least in part on the N discrete antenna elements.

Aspect 22: The method of Aspect 21, wherein the downlink signal is a narrowband signal that has a bandwidth that satisfies a narrowband threshold.

Aspect 23: The method of Aspect 21, wherein the downlink signal is a wideband signal that has a bandwidth that satisfies a wideband threshold.

Aspect 24: The method of Aspect 21, wherein the number of symbols is one symbol fewer than N symbols.

Aspect 25: The method of Aspect 21, wherein the number of symbols is two or more symbols fewer than N symbols.

Aspect 26: The method of Aspect 21, wherein the number of symbols is one.

Aspect 27: The method of any of Aspects 20-26, wherein the two or more discrete antenna elements includes N discrete antenna elements, N being an integer, wherein the signaling comprises an uplink signal, and wherein performing the antenna coherence establishment procedure comprises: receiving multiple portions of the uplink signal in multiple time durations, each respective portion of the multiple portions being received in a respective time duration of the multiple time durations, the multiple time durations being fewer than N time durations.

Aspect 28: The method of Aspect 27, wherein the multiple time durations are based at least in part on a subset of the N discrete antenna elements.

Aspect 29: The method of Aspect 27 or Aspect 28, further comprising: calculating a phase difference between a first portion of the multiple portions of the uplink signal and at least a second portion of the multiple portions; and transmitting an indication of the phase difference.

Aspect 30: The method of Aspect 29, wherein the indication of the phase difference is based at least in part on multiple quantized phase difference values.

Aspect 31: The method of Aspect 29, wherein the indication of the phase difference specifies a measure of uplink coherence.

Aspect 32: The method of Aspect 31, wherein the measure of uplink coherence is based at least in part on at least one of: a low uplink coherence threshold, or a high uplink coherence threshold.

Aspect 33: The method of Aspect 32, wherein the measure of uplink coherence specifies at least one of: full uplink coherence, partial uplink coherence, or no uplink coherence.

Aspect 34: The method of Aspect 27, wherein the uplink signal is a wideband signal that has a bandwidth that satisfies a wideband threshold, and wherein the method further comprises: calculating a first set of phase samples for a first portion of the multiple portions of the uplink signal; calculating a second set of phase samples for a second portion of the multiple portions of the uplink signal; calculating a set of phase differences using the first set of phase samples and the second set of phase samples; computing an estimated phase difference between the first portion and the second portion using the set of phase differences; and transmitting an indication of the estimated phase difference.

Aspect 35: The method of Aspect 34, wherein computing the estimated phase difference comprises: computing an average phase difference using the set of phase differences.

Aspect 36: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-19.

Aspect 37: An apparatus for wireless communication at a device, the apparatus comprising one or more memories and one or more processors coupled to the one or more memories, the one or more processors configured to cause the device to perform the method of one or more of Aspects 1-19.

Aspect 38: An apparatus for wireless communication, the apparatus comprising at least one means for performing the method of one or more of Aspects 1-19.

Aspect 39: A non-transitory computer-readable medium storing code for wireless communication, the code comprising instructions executable by one or more processors to perform the method of one or more of Aspects 1-19.

Aspect 40: A non-transitory computer-readable medium storing a set of instructions for wireless communication, the set of instructions comprising one or more instructions that, when executed by one or more processors of a device, cause the device to perform the method of one or more of Aspects 1-19.

Aspect 41: A device for wireless communication, the device comprising a processing system that includes one or more processors and one or more memories coupled with the one or more processors, the processing system configured to cause the device to perform the method of one or more of Aspects 1-19.

Aspect 42: An apparatus for wireless communication at a device, the apparatus comprising one or more memories and one or more processors coupled to the one or more memories, the one or more processors individually or collectively configured to cause the device to perform the method of one or more of Aspects 1-19.

Aspect 43: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 20-35.

Aspect 44: An apparatus for wireless communication at a device, the apparatus comprising one or more memories and one or more processors coupled to the one or more memories, the one or more processors configured to cause the device to perform the method of one or more of Aspects 20-35.

Aspect 45: An apparatus for wireless communication, the apparatus comprising at least one means for performing the method of one or more of Aspects 20-35.

Aspect 46: A non-transitory computer-readable medium storing code for wireless communication, the code comprising instructions executable by one or more processors to perform the method of one or more of Aspects 20-35.

Aspect 47: A non-transitory computer-readable medium storing a set of instructions for wireless communication, the set of instructions comprising one or more instructions that, when executed by one or more processors of a device, cause the device to perform the method of one or more of Aspects 20-35.

Aspect 48: A device for wireless communication, the device comprising a processing system that includes one or more processors and one or more memories coupled with the one or more processors, the processing system configured to cause the device to perform the method of one or more of Aspects 20-35.

Aspect 49: An apparatus for wireless communication at a device, the apparatus comprising one or more memories and one or more processors coupled to the one or more memories, the one or more processors individually or collectively configured to cause the device to perform the method of one or more of Aspects 20-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having"

A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, coupled to the one or more memories, configured to cause the UE to:

transmit an assistance indication that requests antenna coherence assistance to configure two or more discrete antenna elements with a coherence that satisfies a coherence threshold, wherein the two or more discrete antenna elements include N discrete antenna elements, N being an integer; and perform, based at least in part on signaling, an antenna coherence establishment procedure that is based at least in part on:

using a first discrete antenna element of the two or more discrete antenna elements as an anchor antenna element, and obtaining a respective phase relationship between the anchor antenna element and at least a second discrete antenna element of the two or more discrete antenna elements, wherein the one or more processors, to cause the UE to perform the antenna coherence establishment procedure, are configured to cause the UE to:

receive, when the signaling comprises a downlink signal and for each respective discrete antenna element of the N discrete antenna elements that is not the anchor antenna element, a respective symbol of the downlink signal using a respective antenna pair that includes the anchor antenna element and the respective discrete antenna element, or transmit, when the signaling comprises an uplink signal for each respective discrete antenna element of the N discrete antenna elements that is not the anchor antenna element, multiple portions of the of the uplink signal in multiple time durations, each respective portion of the multiple portions being transmitted in a respective time duration of the multiple time durations and using the respective antenna pair that includes the anchor antenna element and the respective discrete antenna element.

2. The apparatus of claim 1, wherein the signaling comprises the downlink signal, and wherein the one or more processors, to cause the UE to perform the antenna coherence establishment procedure, are configured to cause the UE to:

receive, for each respective discrete antenna element of the N discrete antenna elements that is not the anchor antenna element, the respective symbol of the down-link signal using the respective antenna pair that includes the anchor antenna element and the respective discrete antenna element.

3. The apparatus of claim 2,
wherein the downlink signal is a wideband signal that has a bandwidth that satisfies a wideband threshold, and
wherein the one or more processors, to cause the UE to obtain the respective phase relationship between the anchor antenna element and the at least the second discrete antenna element, are configured to cause the UE to:
   compute multiple phase estimations using multiple samples of the respective symbol; and
   compute the respective phase relationship using the multiple phase estimations.

4. The apparatus of claim 1,
wherein the integer is greater than two, and
wherein the one or more processors, to cause the UE to perform the antenna coherence establishment procedure, are further configured to cause the UE to:
   perform the antenna coherence establishment procedure using a subset of discrete antenna elements from the N discrete antenna elements.

5. The apparatus of claim 4,
wherein the one or more processors are further configured to cause the UE to:
   select the subset of discrete antenna elements from the N discrete antenna elements based at least in part on a respective power metric of each discrete antenna element in the N discrete antenna elements.

6. The apparatus of claim 1,
wherein the signaling comprises the uplink signal, and
wherein the one or more processors, to cause the UE to perform the antenna coherence establishment procedure, are configured to cause the UE to:
   transmit, for each respective discrete antenna element of the N discrete antenna elements that is not the anchor antenna element, the respective time duration of the uplink signal using the respective antenna pair that includes the anchor antenna element and the respective discrete antenna element.

7. The apparatus of claim 1,
wherein the one or more processors, to cause the UE to obtain the respective phase relationship between the anchor antenna element and the at least the second discrete antenna element, are configured to cause the UE to:
   receive an indication of the respective phase relationship from a network node.

8. The apparatus of claim 1,
wherein the integer is greater than two,
wherein the signaling comprises the uplink signal, and
wherein the one or more processors, to cause the UE to perform the antenna coherence establishment procedure, are configured to cause the UE to:
   perform the antenna coherence establishment procedure using a subset of discrete antenna elements from the N discrete antenna elements to transmit the uplink signal.

9. The apparatus of claim 8,
wherein the one or more processors are further configured to cause the UE to:
   select the subset of discrete antenna elements from the N discrete antenna elements based at least in part on a respective power metric of each discrete antenna element in the N discrete antenna elements.

10. An apparatus for wireless communication at a network node, comprising:
   one or more memories; and
   one or more processors, coupled to the one or more memories, configured to cause the network node to:
      receive an assistance indication that requests antenna coherence assistance to configure two or more discrete antenna elements at a user equipment (UE) with a coherence that satisfies a coherence threshold, wherein the two or more discrete antenna elements include N discrete antenna elements, N being an integer; and
      perform an antenna coherence establishment procedure with the UE, wherein, to perform the antenna coherence establishment procedure, the one or more processors are configured to:
         receive multiple portions of an uplink signal in multiple time durations, each respective portion of the multiple portions being received in a respective time duration of the multiple time durations, the multiple time durations being fewer than N time durations;
         calculate a phase difference between a first portion of the multiple portions of the uplink signal and at least a second portion of the multiple portions; and
         transmit an indication of the phase difference.

11. The apparatus of claim 10,
wherein the one or more processors are configured to cause the network node to:
   transmit a downlink signal using a number of symbols that is based at least in part on the N discrete antenna elements.

12. The apparatus of claim 10,
wherein the indication of the phase difference is based at least in part on multiple quantized phase difference values.

13. The apparatus of claim 10,
wherein the indication of the phase difference specifies a measure of uplink coherence.

14. The apparatus of claim 10,
wherein the uplink signal is a wideband signal that has a bandwidth that satisfies a wideband threshold,
wherein, to calculate the phase difference, the one or more processors are configured to cause the network node to:
   calculate a first set of phase samples for a first portion of the multiple portions of the uplink signal;
   calculate a second set of phase samples for a second portion of the multiple portions of the uplink signal;
   calculate a set of phase differences using the first set of phase samples and the second set of phase samples; and
   compute an estimated phase difference between the first portion and the second portion using the set of phase differences, and
wherein, to transmit the indication, the one or more processors are configured to cause the network node to:
   transmit an indication of the estimated phase difference.

15. A method of wireless communication performed by a user equipment (UE), comprising:
   transmitting an assistance indication that requests antenna coherence assistance to configure two or more discrete antenna elements with a coherence that satisfies a coherence threshold, wherein the two or more discrete antenna elements include N discrete antenna elements, N being an integer; and performing, based at least in part on signaling, an antenna coherence establishment procedure that is based at least in part on:

using a first discrete antenna element of the two or more discrete antenna elements as an anchor antenna element, and obtaining a respective phase relationship between the anchor antenna element and at least a second discrete antenna element of the two or more discrete antenna elements, wherein performing the antenna coherence establishment procedure comprises:

receiving, when the signaling comprises a downlink signal and for each respective discrete antenna element of the N discrete antenna elements that is not the anchor antenna element, a respective symbol of the downlink signal using a respective antenna pair that includes the anchor antenna element and the respective discrete antenna element, or transmitting, when the signaling comprises an uplink signal for each respective discrete antenna element of the N discrete antenna elements that is not the anchor antenna element, multiple portions of the of the uplink signal in multiple time durations, each respective portion of the multiple portions being transmitted in a respective time duration of the multiple time durations and using the respective antenna pair that includes the anchor antenna element and the respective discrete antenna element.

16. The method of claim 15, wherein the signaling comprises the downlink signal, and wherein performing the antenna coherence establishment procedure comprises:

receiving, for each respective discrete antenna element of the N discrete antenna elements that is not the anchor antenna element, the respective symbol of the downlink signal using the respective antenna pair that includes the anchor antenna element and the respective discrete antenna element.

17. The method of claim 15, wherein the integer is greater than two, and wherein performing the antenna coherence establishment procedure further comprises:

performing the antenna coherence establishment procedure using a subset of discrete antenna elements from the N discrete antenna elements.

18. The method of claim 15, wherein the signaling comprises the uplink signal, and wherein performing the antenna coherence establishment procedure comprises:

transmitting, for each respective discrete antenna element of the N discrete antenna elements that is not the anchor antenna element, the respective time duration of the uplink signal using the respective antenna pair that includes the anchor antenna element and the respective discrete antenna element.

19. The method of claim 15, wherein obtaining the respective phase relationship between the anchor antenna element and the at least the second discrete antenna element comprises:

receiving an indication of the respective phase relationship from a network node.

20. The method of claim 15, wherein the integer is greater than two, wherein the signaling comprises the uplink signal, and wherein performing the antenna coherence establishment procedure comprises:

performing the antenna coherence establishment procedure using a subset of discrete antenna elements from the N discrete antenna elements to transmit the uplink signal.

* * * * *